United States Patent
Harada et al.

(10) Patent No.: US 9,077,914 B2
(45) Date of Patent: Jul. 7, 2015

(54) IMAGE PROCESSING APPARATUS AND CONTROL METHOD THEREOF PRINTING IMAGE DATA HAVING M TONES UNDER INFRARED LIGHT

(75) Inventors: Koji Harada, Yokohama (JP); Junichi Hayashi, Kamakura (JP); Masanori Yokoi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 504 days.

(21) Appl. No.: 13/277,064

(22) Filed: Oct. 19, 2011

(65) Prior Publication Data
US 2012/0127492 A1 May 24, 2012

(30) Foreign Application Priority Data
Nov. 19, 2010 (JP) ................. 2010-259522

(51) Int. Cl.
H04N 1/40 (2006.01)
H04N 1/32 (2006.01)

(52) U.S. Cl.
CPC ...... *H04N 1/32309* (2013.01); *H04N 2201/327* (2013.01); *H04N 2201/3271* (2013.01); *H04N 2201/0082* (2013.01)

(58) Field of Classification Search
CPC ............ G06K 15/4095; H04N 1/0087; H04N 1/32309; H04N 1/605
USPC .................. 358/1.9, 2.1, 3.01, 3.28, 523, 524; 399/54, 56
See application file for complete search history.

(56) References Cited

U.S. PATENT DOCUMENTS

| | | | | |
|---|---|---|---|---|
| 5,708,717 A | * | 1/1998 | Alasia | 380/51 |
| 5,903,712 A | * | 5/1999 | Wang et al. | 358/1.9 |
| 6,106,110 A | * | 8/2000 | Gundjian et al. | 347/86 |
| 6,153,879 A | | 11/2000 | Yoshinaga | |

(Continued)

FOREIGN PATENT DOCUMENTS

| | | | | |
|---|---|---|---|---|
| EP | 2165844 A2 | * | 3/2010 | B41M 3/14 |
| JP | 3544536 B2 | | 7/2004 | |

(Continued)

OTHER PUBLICATIONS

U.S. Appl. No. 13/284,719 by Masanori Yokoi, filed Oct. 28, 2011.

(Continued)

*Primary Examiner* — Jamares Q Washington
(74) *Attorney, Agent, or Firm* — Fitzpatrick, Cella, Harper & Scinto

(57) ABSTRACT

This invention can generate printed matter on which a multi-valued discrimination image of three values or more cannot be visually confirmed under ordinary light but can be visually confirmed via an infrared camera under infrared light. To this end, a holding unit holds items of color information C1, C2, and C3 each indicating usage amounts of printing materials of three types, used by a printing apparatus, which have a color difference under visible light not more than a pre-set threshold, and which have different infrared light ray absorption rates. When a latent image generating unit generates infrared light ray latent image data of three tones, a discrimination image data generating unit decides one color information item $C_i$ ($1 \leq i \leq 3$) held by the holding unit, and outputs the decided $C_i$ to an output unit which outputs the received pixel values to the printing apparatus.

6 Claims, 22 Drawing Sheets

(56) References Cited

U.S. PATENT DOCUMENTS

| | | |
|---|---|---|
| 7,826,112 B2 | 11/2010 | Sawada |
| 8,045,242 B2 | 10/2011 | Sawada |
| 8,111,432 B2 | 2/2012 | Eschbach |
| 8,482,325 B2 | 7/2013 | Ohmine |
| 2003/0214686 A1* | 11/2003 | Saito et al. .................... 358/504 |
| 2004/0255808 A1 | 12/2004 | Nagashima |
| 2005/0128498 A1 | 6/2005 | Matsuzaki |
| 2005/0208397 A1* | 9/2005 | Nakamura et al. .............. 430/45 |
| 2009/0207197 A1* | 8/2009 | Maki ................................ 347/5 |
| 2011/0032553 A1 | 2/2011 | Funahashi |
| 2011/0032554 A1* | 2/2011 | Matsuhira ..................... 358/1.9 |
| 2013/0057880 A1 | 3/2013 | Yokoi |

FOREIGN PATENT DOCUMENTS

| | | |
|---|---|---|
| JP | 2005-125552 | 5/2005 |
| JP | 2006-303807 | 11/2006 |
| JP | 2009-268081 | 11/2009 |

OTHER PUBLICATIONS

U.S. Appl. No. 13/287,693 by Junichi Hayashi, filed Nov. 2, 2011.
Japanese Office Action dated Oct. 24, 2014 issued during prosecution of related Japanese application No. 2010-259522.

* cited by examiner

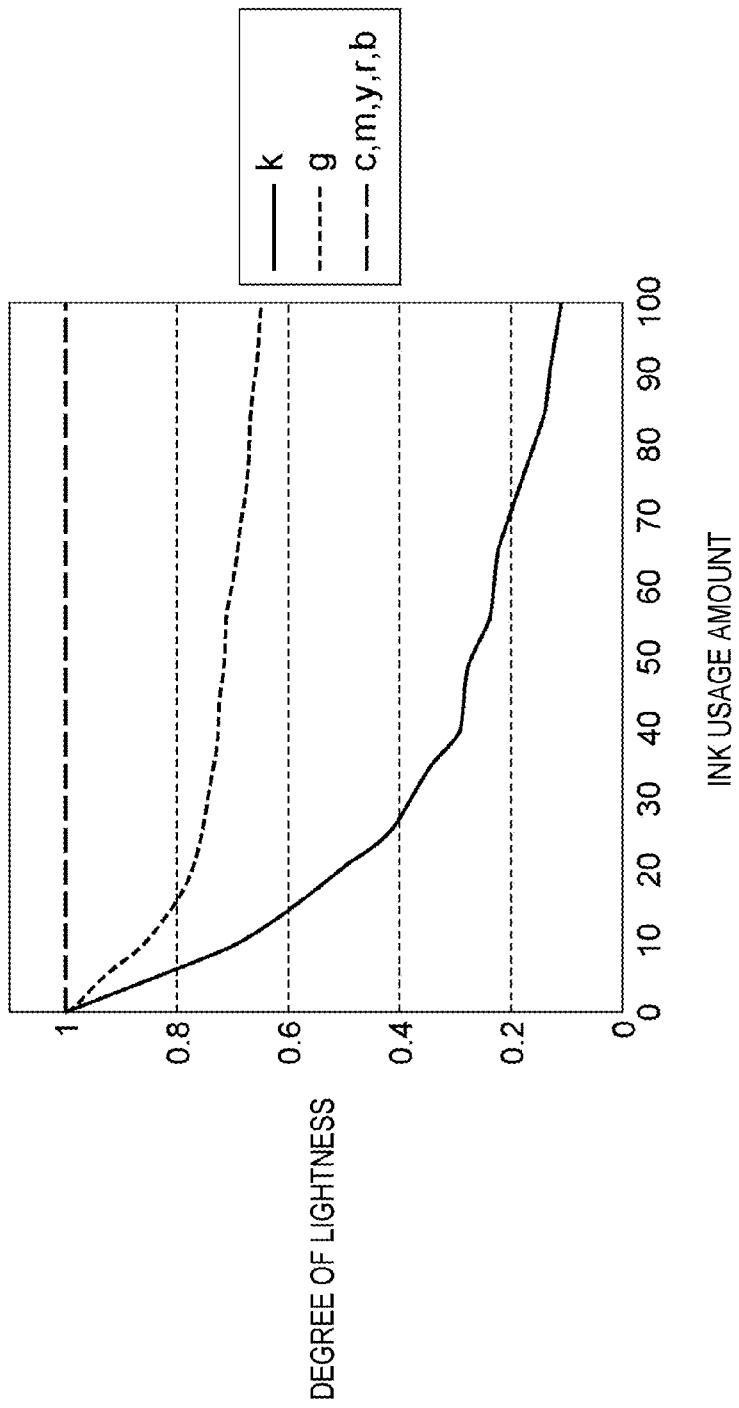

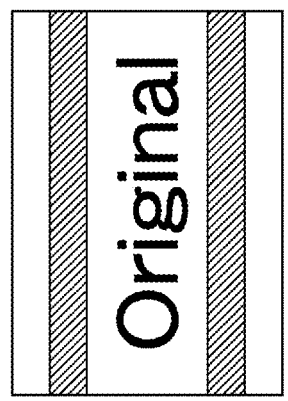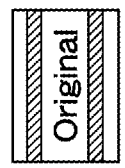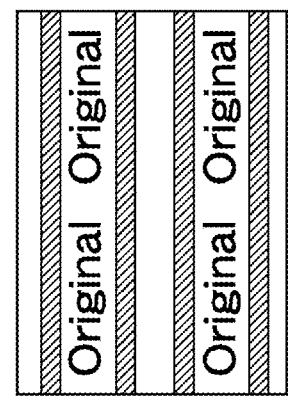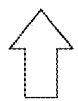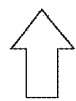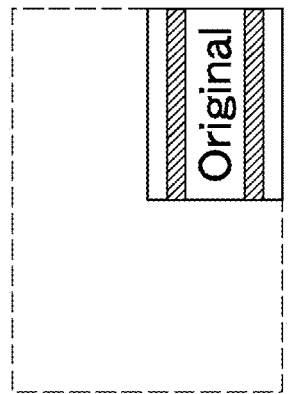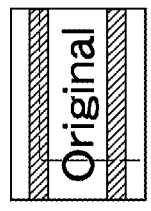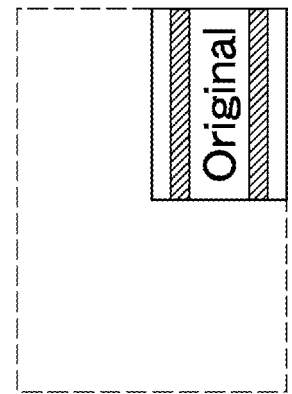
F I G. 6A   F I G. 6B   F I G. 6C

91 — 
| INK USAGE AMOUNT | | | | COLOR MEASUREMENT DATA | | |
|---|---|---|---|---|---|---|
| C | M | Y | K | L* | a* | b* |
| C11 | M11 | Y11 | 0 | L*11 | a*11 | b*11 |
| C12 | M12 | Y12 | 0 | L*12 | a*12 | b*12 |
| .. | .. | .. | .. | .. | .. | .. |

92 —
| INK USAGE AMOUNT | | | | COLOR MEASUREMENT DATA | | |
|---|---|---|---|---|---|---|
| C | M | Y | K | L* | a* | b* |
| C21 | M21 | Y21 | 2 | L*21 | a*21 | b*21 |
| C22 | M22 | Y22 | 2 | L*22 | a*122 | b*22 |
| .. | .. | .. | .. | .. | .. | .. |

93 —
| INK USAGE AMOUNT | | | | COLOR MEASUREMENT DATA | | |
|---|---|---|---|---|---|---|
| C | M | Y | K | L* | a* | b* |
| C51 | M51 | Y51 | 4 | L*51 | a*51 | b*51 |
| C52 | M52 | Y52 | 4 | L*52 | a*52 | b*52 |
| .. | .. | .. | .. | .. | .. | .. |

95 —
| INK USAGE AMOUNT | | | | COLOR MEASUREMENT DATA | | |
|---|---|---|---|---|---|---|
| C | M | Y | G | L* | a* | b* |
| C21 | M21 | Y21 | 0 | L*21 | a*21 | b*21 |
| C22 | M22 | Y22 | 0 | L*22 | a22 | b*22 |
| .. | .. | .. | .. | .. | .. | .. |

96 —
| INK USAGE AMOUNT | | | | COLOR MEASUREMENT DATA | | |
|---|---|---|---|---|---|---|
| C | M | Y | G | L* | a* | b* |
| C21 | M21 | Y21 | 2 | L*21 | a*21 | b*21 |
| C22 | M22 | Y22 | 2 | L*22 | a*22 | b*22 |
| .. | .. | .. | .. | .. | .. | .. |

97 —
| INK USAGE AMOUNT | | | | COLOR MEASUREMENT DATA | | |
|---|---|---|---|---|---|---|
| C | M | Y | G | L* | a* | b* |
| C51 | M51 | Y51 | 4 | L*51 | a*51 | b*51 |
| C52 | M52 | Y52 | 4 | L*52 | a*52 | b*52 |
| .. | .. | .. | .. | .. | .. | .. |

FIG. 11

| PIXEL VALUE Np (RGB VALUES) | COLOR INFORMATION Ci | | | | | | | | | | | | | | | | | | | | |
|---|---|---|---|---|---|---|---|---|---|---|---|---|---|---|---|---|---|---|---|---|---|
| | FIRST COLOR C1 | | | | | | | SECOND COLOR C2 | | | | | | | THIRD COLOR C3 | | | | | | |
| | C | M | Y | K | R | G | B | C | M | Y | K | R | G | B | C | M | Y | K | R | G | B |
| Np1 | 24 | 13 | 09 | 00 | 00 | 00 | 00 | 00 | 20 | 00 | 00 | 00 | 50 | 00 | 00 | 20 | 00 | 00 | 00 | 60 | 00 |
| Np2 | 24 | 13 | 09 | 00 | 00 | 00 | 00 | 23 | 11 | 07 | 03 | 00 | 00 | 00 | 00 | 20 | 00 | 00 | 00 | 50 | 00 |
| Np3 | 35 | 35 | 35 | 00 | 00 | 00 | 00 | 35 | 35 | 35 | 03 | 00 | 00 | 00 | 35 | 35 | 35 | 07 | 00 | 00 | 00 |
| Np4 | 35 | 35 | 35 | 00 | 00 | 00 | 00 | 35 | 35 | 35 | 00 | 00 | 10 | 00 | 35 | 35 | 35 | 05 | 00 | 00 | 00 |
| Np5 | 25 | 00 | 25 | 00 | 00 | 00 | 00 | 20 | 00 | 20 | 00 | 00 | 10 | 00 | 15 | 00 | 15 | 00 | 00 | 05 | 00 |
| Np6 | 25 | 00 | 25 | 00 | 00 | 00 | 00 | 20 | 00 | 20 | 00 | 00 | 10 | 00 | 00 | 00 | 00 | 00 | 00 | 20 | 00 |

| 0 | C0,0 | C0,1 | ... | C0,n |
| 1 | C1,0 | C1,1 | ... | C1,n |
| 2 | C2,0 | C2,1 | ... | C2,n |

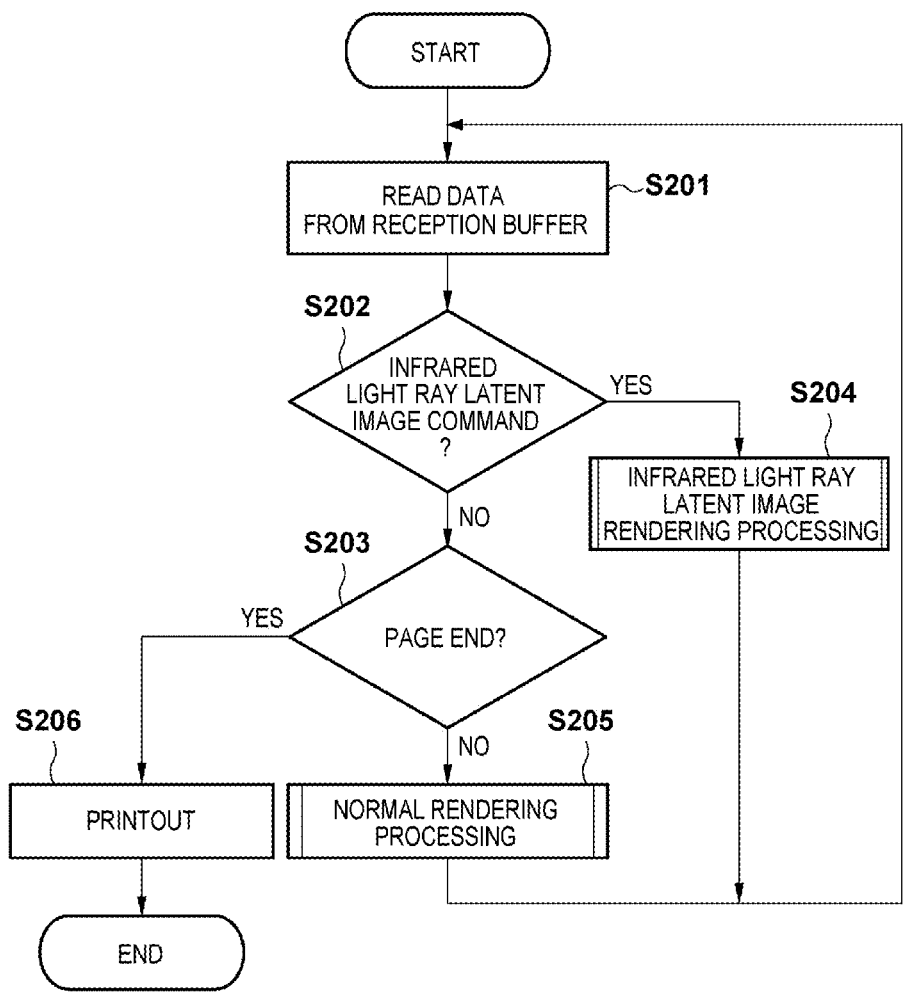

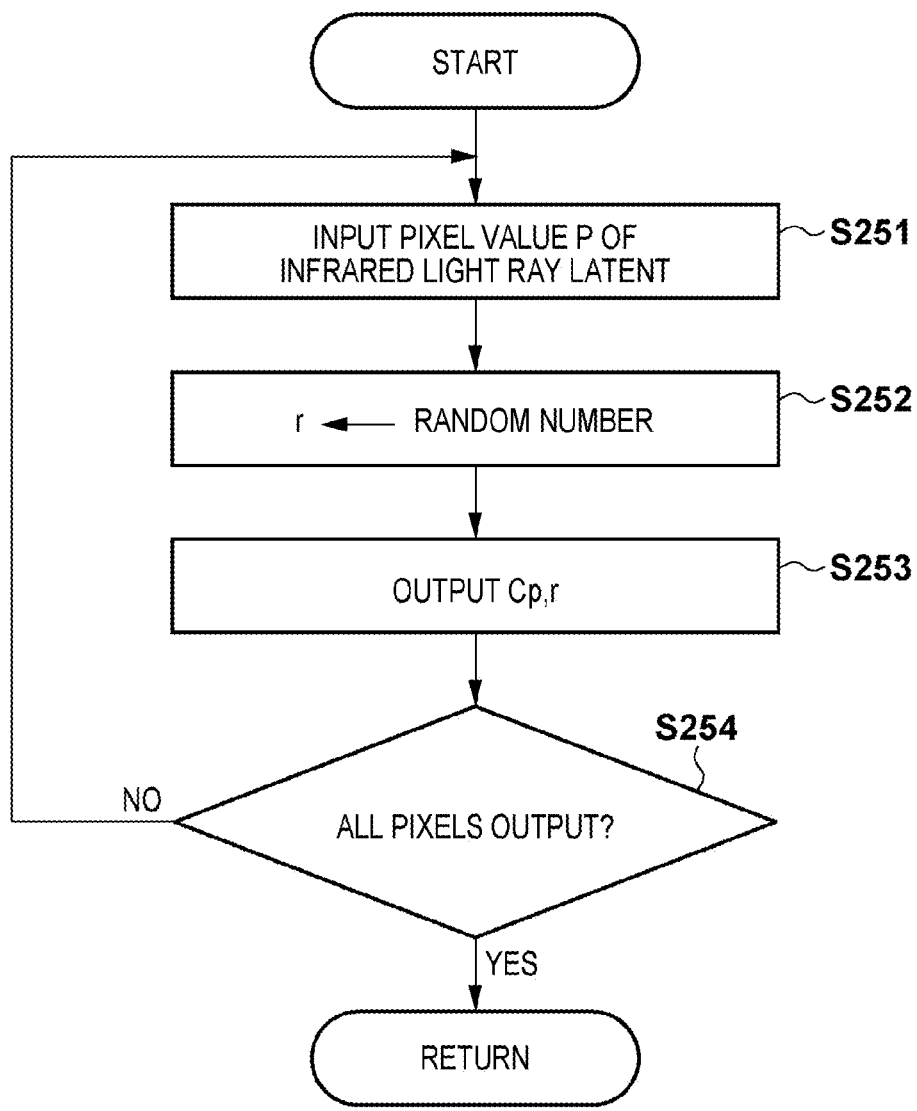

IMAGE PROCESSING APPARATUS AND CONTROL METHOD THEREOF PRINTING IMAGE DATA HAVING M TONES UNDER INFRARED LIGHT

BACKGROUND OF THE INVENTION

1. Field of the Invention

The present invention relates to a technique for generating image data to be output to a printing unit.

2. Description of the Related Art

An anti-counterfeit technique or authenticity determination technique for printed matter includes a printing method of an image which cannot be visually recognized (or is difficult to visually recognize) under ordinary light but can be easily recognized using an apparatus such as an infrared camera sensitive to the infrared light range under infrared light.

As a representative printing method, the following method is known (for example, Japanese Patent No. 3544536). That is, using the fact that of inks of respective color components (i.e., cyan (C), magenta (M), yellow (Y), and black (K)), only black (K) ink has a large infrared absorption characteristic, an image is printed on a printing medium using black (K) for a latent image region and using cyan (C), magenta (M), and yellow (Y), which have a small infrared absorption characteristic, for a background region; output printed matter may then be irradiated with infrared light in order to allow discrimination of an image using an infrared camera.

According to the method described in this document, under infrared light, a portion generated using black (K) becomes dark, and a portion generated using cyan (C), magenta (M), and yellow (Y) becomes bright. In this way, a binary discrimination image configured by bright and dark portions can be made to appear under infrared light.

According to the related art, although a binary discrimination image can be made to appear under infrared light, it is difficult to cause the appearance of a multi-valued discrimination image of three values or more. For this reason, design of a discrimination images to be made to appear suffers large limitations. When this technique is applied to an anti-counterfeit technique of printed matter, a binary discrimination image is likely to be relatively easy to counterfeit.

SUMMARY OF THE INVENTION

The present invention has been made in consideration of the aforementioned problems, and provides a technique for generating printed matter on which a multi-valued discrimination image of three values or more cannot be visually recognized under ordinary light but can be visually recognized via, for example, an infrared camera under infrared light.

In order to solve the above problems, according to an aspect of the invention, there is provided an image processing apparatus for outputting print image data to a printing unit which prints an image by applying a printing material to a printing medium, comprising: a color information holding unit which holds items of color information $C1, C2, \ldots, CN$ each indicating usage amounts of printing materials, used by the printing unit, of N types ($N \geq 3$), a color difference under visible light of which is not more than a pre-set threshold, and which have different infrared light ray absorption rates; a latent image input unit which inputs infrared light ray latent image data of M tones ($N \geq M \geq 3$); and an output unit which decides one color information item $Ci$ ($1 \leq i \leq N$) held by the color information holding unit according to a value of a pixel of interest of the input infrared light ray latent image data, and outputs, to the printing unit, the decided color information item $Ci$ as pixel values of print image data corresponding to the pixel of interest.

According to the present invention, a multi-valued discrimination image of at least three values or more, which cannot be visually recognized under ordinary light but can be discriminated under infrared light, can be generated.

Further features of the present invention will become apparent from the following description of exemplary embodiments (with reference to the attached drawings).

BRIEF DESCRIPTION OF THE DRAWINGS

FIG. 2 is a graph for explaining infrared absorption characteristics of inks according to an embodiment of the present invention;

FIGS. 6A to 6C are views for explaining a layout method of a discrimination image according to an embodiment of the present invention;

FIGS. 9A and 9B are views for explaining examples of color measurement data according to an embodiment of the present invention;

FIG. 11 is a view for explaining an example of a color information table according to an embodiment of the present invention;

FIG. 20 is a flowchart showing print processing according to the second embodiment of the present invention; and FIG. 21 is a flowchart showing infrared light ray latent image rendering processing according to the second embodiment of the present invention.

DESCRIPTION OF THE EMBODIMENTS

Embodiments according to the present invention will be described in detail hereinafter with reference to the accompanying drawings.

<First Embodiment>

Basic Concept

Figure 1A:
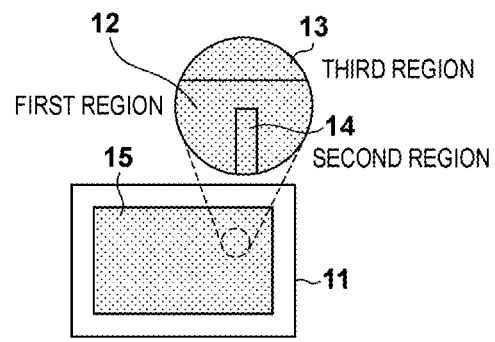
FIGS. 1A to 1D are views for explaining the principle of a discrimination image according to an embodiment of the present invention.
Figure 1B:
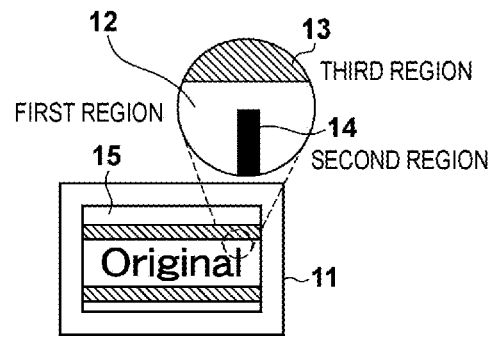

The basic concept of this embodiment will be briefly described first with reference to FIGS. 1A to 1D. On a printing medium 11, an image, which cannot be discriminated under visible light or ordinary light (for example, D50 as light for colorimetry, a relative spectral distribution of which is specified by CIE (Commission Internationale de l'Éclairage), is printed, as shown in FIG. 1A (a border line of an enlarged portion in FIG. 1A is added to ease understanding). Then, by viewing an image of this printing medium which is captured using a special discrimination apparatus such as an infrared camera under infrared light, a discrimination image 15, characters (or patterns) of which are visualized, can be visually recognized, as shown in FIG. 1B. In case of FIG. 1B, the discrimination image 15 includes a first region as a background portion, a second region as a text portion "Original", and third regions as line image portions which are horizontally drawn above and below the text portion. This allows an authenticity determination to be performed such that when characters (or patterns) can be confirmed on printed matter under infrared light, the printed matter is authentic and when they cannot be confirmed, the printed matter is not authentic.

In order to implement such an authenticity determination, it is required to print the first to third regions by applying inks (printing materials) having different infrared light ray absorption rates (or infrared light ray reflectances) under infrared light on a printing medium, so as to have the same color under ordinary light (to have a color difference which cannot be directly discriminated or is at least difficult to discriminate by human vision).

Figure 1C:
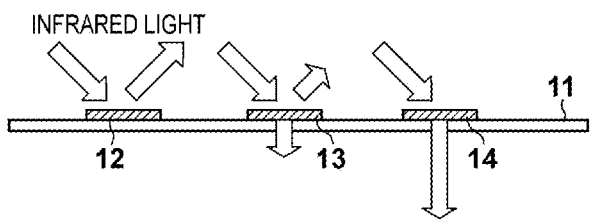

FIG. 1C is a side view of degrees of reflection of irradiated infrared light rays when a first region 12 is formed using an ink having small infrared absorption characteristics, a second region 14 is formed using an ink having large infrared absorption characteristics, and a third region 13 is formed using an ink, the infrared absorption characteristics of which are larger than the ink which forms the first region 12 and are smaller than the ink which forms the second region 14. As shown in FIG. 1C, the first region 12 reflects most infrared light rays since it has a small infrared absorption characteristic, while the second region 14 absorbs infrared light rays and does not reflect any infrared light rays since it has a large infrared absorption characteristic. Also, the third region 13 reflects some infrared light rays and absorbs the remaining infrared light rays since its infrared absorption characteristic is larger than the first region and is smaller than the second region.

Figure 1D:
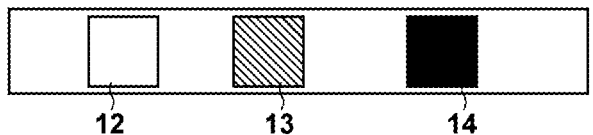

When this image is irradiated with infrared light and is observed using an infrared camera (to be displayed as an image having an infrared intensity as a luminance level), the first region 12 has a high lightness level, but the second region 14 has a low lightness level, as shown in FIG. 1D. Also, the third region 13 has an intermediate lightness level between the first and second regions 12 and 14.

Of the four basic color component inks, that is, cyan (C), magenta (M), yellow (Y), and black (K), which are used in normal printing, black (K) is a black color material mainly containing carbon black, and has large infrared absorption characteristics. By contrast, it is known that cyan (C), magenta (M), and yellow (Y) have small infrared absorption characteristics.

Therefore, for example, when the second region 14 is formed using only black (K), the first region 12 is formed using cyan (C), magenta (M), and yellow (Y) to have a color approximate to the second region 14, and the third region 13 is formed using cyan (C), magenta (M), yellow (Y), and black (Y), the aforementioned discrimination image 15 can be generated. In this case, it should be noted that the amount of black (K) which is used to form the third region 13 is smaller than the amount of black (K) which is used to form the second region 14.

Note that recently, a printing apparatus is available, which also mounts three expansion color inks, that is, red (R), green (G), and blue (B) in addition to the aforementioned four basic color inks, so as to expand a color gamut that can be expressed. It is known that green (G) of these three expansion color inks is a green color material mainly containing copper and chromium, and has large infrared absorption characteristics.

FIG. 2 shows a graph which represents degrees of lightness (abscissa) with respect to changes in ink usage amount (ordinate) per unit area of unicolor inks (cyan, magenta, yellow, black, red, green, and blue). This graph is obtained by printing a plurality of measurement patches whose ink usage amounts per unit area are changed for respective unicolor inks on a printing medium, measuring lightness levels (strictly speaking, reflection intensities of infrared light rays) using an infrared camera in an environment in which the patches are irradiated with infrared light, and converting numerical values into a graph. Note that a lightness level of the printing medium on which the measurement patches are printed is defined as "1". As can be confirmed from this graph, the infrared absorption characteristics of black (K) and green (G) are larger than that of the remaining inks, and degrees of lightness are different depending upon ink types even when the ink usage amount remains the same. Also, as can be seen from this graph, the degrees of lightness of black and green are decreased with increasing ink usage amount.

The present invention provides a technique which can form a discrimination image, as shown in FIGS. 1A to 1D, while focusing on the aforementioned different infrared absorption characteristics of inks.

Basic Arrangement

Figure 3:
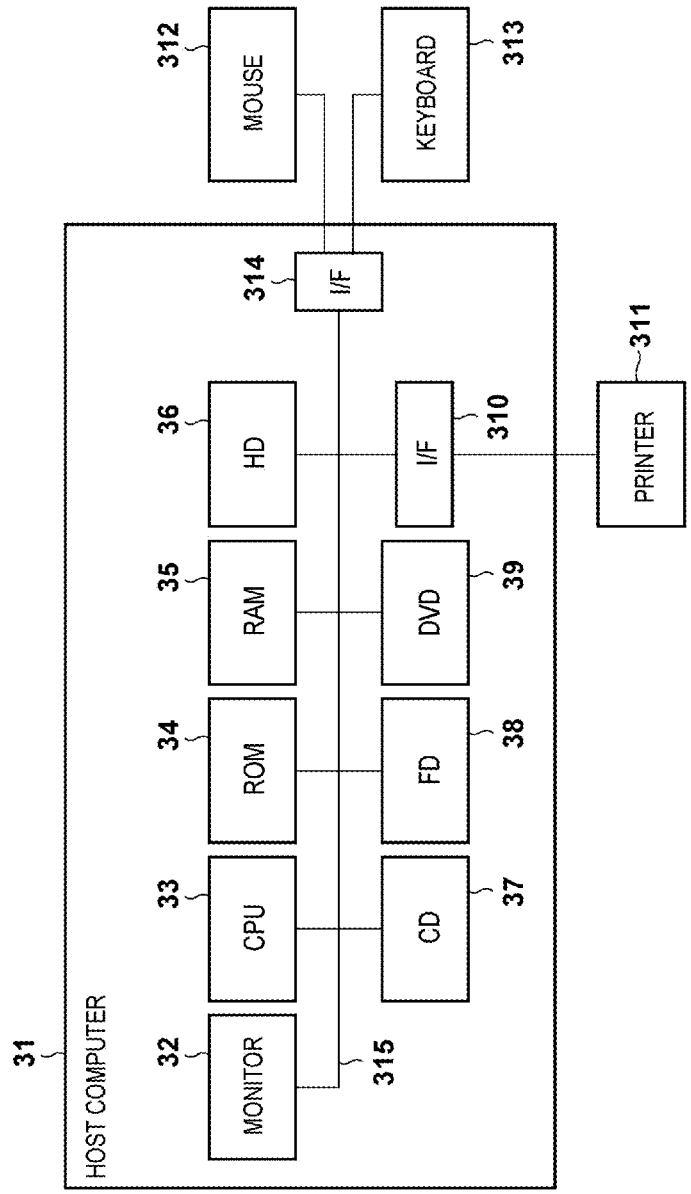
FIG. 3 is a block diagram for explaining the arrangement of a host computer according to an embodiment of the present invention.

A host computer applicable to this embodiment will be described below with reference to FIG. 3. FIG. 3 shows the basic arrangement of a host computer which functions as an image generating apparatus (FIG. 4) and color information generating apparatus (FIG. 7) according to this embodiment, and also the relationship with its peripheral devices.

Referring to FIG. 3, a host computer 31 is, for example, a generally prevalent personal computer, and can store image data in an HD 36, CD 37, FD 38, or DVD 39, and can also display the stored image data on a monitor 32. Furthermore, the host computer 31 can print these image data as, for example, paper documents using a printer 311 or the like. Various instructions from the user are input via a mouse 312 and keyboard 313. Inside the host computer 31, respective blocks to be described below are connected via a bus 315 to be allowed to exchange various data.

In FIG. 3, reference numeral 32 denotes a monitor which can display various kinds of information from the host computer 31. Reference numeral 33 denotes a CPU which can control respective units in the host computer 31 or can execute programs loaded into a RAM 35. Reference numeral 34 denotes a ROM which stores a BIOS and a boot program. Reference numeral 35 denotes a RAM used to temporarily store programs and image data to be processed so as to allow the CPU 33 to execute processing. On the RAM 35, an OS and programs required for the CPU 33 to execute various processes to be described later are loaded. Reference numeral 36 denotes a hard disk (HD) which stores the OS and programs to be transferred to the RAM or the like, and is used to allow the apparatus to store or read out image data during operations. Reference numeral 37 denotes a CD-ROM drive which can load or write out data stored in a CD-ROM (CD-R, CD-R/W, and the like) as one of external storage media. Reference numeral 38 denotes an FD drive which can load or write out data to or from an FD (Floppy® disk) as in the CD-ROM drive 37. Reference numeral 39 denotes a DVD-ROM drive (DVD-RAM) drive which can load data from a DVD-ROM and can write out data to a DVD-RAM as in the CD-ROM drive 37. Note that when programs for image processing are stored on an CD-ROM, FD, DVD-ROM, or the like, these programs are installed in the HD 36, and are transferred into the RAM 35 as needed. Reference numeral 310 denotes an I/F required to connect the host computer 31 to the printer 311 which prints image data stored in the RAM 35, HD 36, CD-ROM 37, FD 38, DVD 39, or the like on, for example, paper documents. The host computer 31 transfers image data and the like to the printer 311 via the I/F 310 to execute print processing. Reference numeral 314 denotes an I/F required to connect the mouse 312 and keyboard 313 to the host computer 31. Various instructions input from the mouse 312 and keyboard 313 via the I/F 314 are input to the CPU 33.

Arrangement of Image Generating Apparatus

The functional arrangement of an image generating apparatus applied to this embodiment will be described below with reference to FIG. 4. Note that the following description corresponds to a case in which a power supply of the aforementioned host computer 31 is turned on, and the OS is loaded into the work memory 35. In this case, respective processing units are implemented by corresponding programs and the CPU 33 which executes them or peripheral hardware components in some cases.

Figure 4:
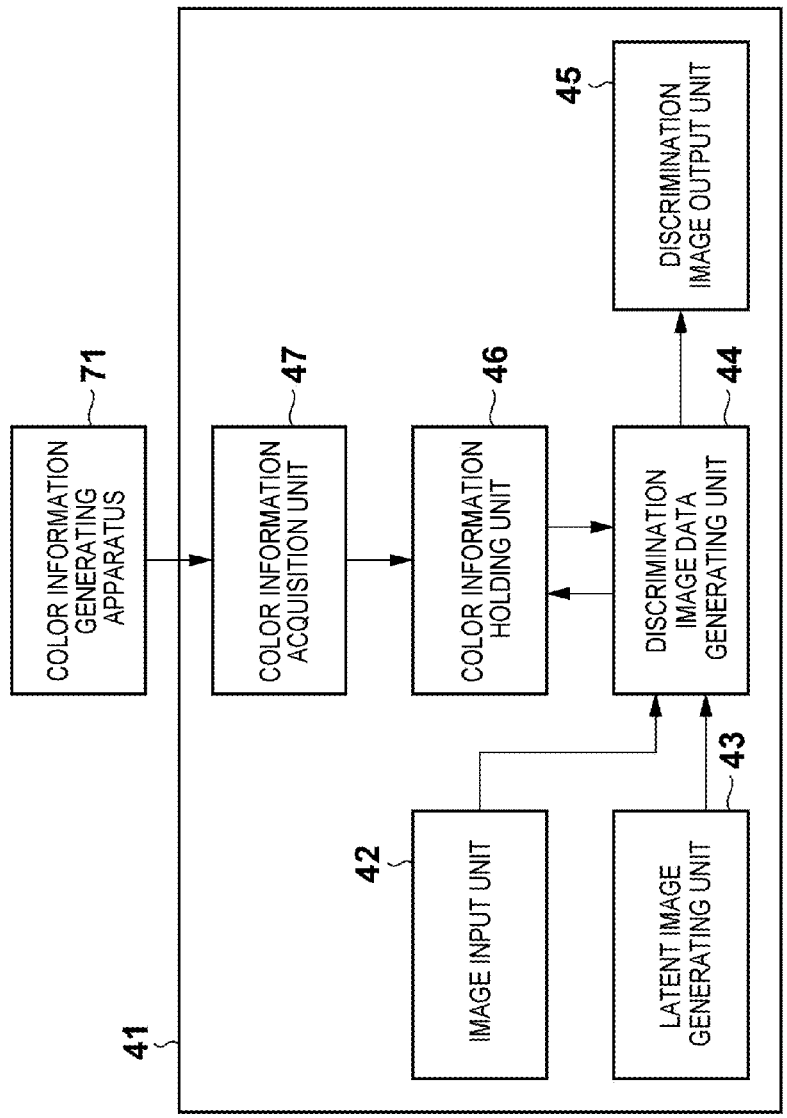
FIG. 4 is a block diagram for explaining the arrangement of an image generating apparatus according to an embodiment of the present invention.

As shown in FIG. 4, an image generating apparatus 41 of this embodiment includes an image input unit 42, latent image generating unit 43, discrimination image data generating unit 44, discrimination image output unit 45, color information holding unit 46, and color information acquisition unit 47. Note that image processing to be described below may be implemented by software processing. In this case, the respective units should be considered as conceptual units of functions required for the processing.

The image input unit 42 inputs image data as a counterfeit suppression target in this embodiment. The input image data is output to the discrimination image generating unit 44.

The image data as the counterfeit suppression target in this embodiment is a set of data each having RGB values for each pixel, and is, for example, graphic data such as multi-valued image data. When non-image data such as text data is input as image data, it undergoes rasterization processing to be converted into image data, and then undergoes the subsequent processes.

In order to input image data, the image input unit 42 reads out image data stored in advance in the ROM 34, RAM 35, HD 36, CD 37, FD 38, DVD 39, and the like in FIG. 3. Alternatively, the image input unit 42 receives image data from a network using, for example, a network interface (not shown) and uses the received image data. Alternatively, the image input unit 42 converts documents printed on paper sheets using a scanner or digital camera into digital data, and uses that data. The present invention can use various means to input image data without being particularly limited to them, and can use arbitrary input sources. Image data input by the image input unit 42 is temporarily held in the RAM 35.

Figure 12A:
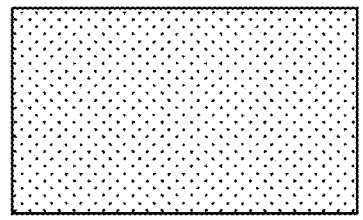
FIGS. 12A to 12E are views for explaining an example of a discrimination image according to an embodiment of the present invention.

In this embodiment, for example, unicolor image data can be input, as shown in FIG. 12A. When the image data shown in FIG. 12A is applied, a uniform unicolor region under ordinary light can provide an effect of visualizing a discrimination image (to be described later) under infrared light. Alternatively, image data formed using a plurality of colors may be input, as shown in FIG. 12E. FIG. 12E is a grayscale image, and stripes of halftone dots included in FIG. 12E represent tones of different brightness levels. FIG. 12E expresses a gradation in which brightness levels decrease stepwise from the left to the right. Alternatively, FIG. 12E is a color image, and stripes of halftone dots included in FIG. 12E may represent different colors. In this case, FIG. 12E expresses a gradation in which colors change stepwise from the left to the right. When the image data shown in FIG. 12E is applied, an effect can be provided whereby a user is able to visually recognize a pattern of a plurality of colors (a gradation pattern in which brightness levels decrease gradually from the left to the right in FIG. 12E) under ordinary light, and that pattern can be changed into a discrimination image (to be described later) under infrared light.

Note that in this embodiment, as an example of image data formed using a plurality of colors, the gradation image shown in FIG. 12E will be exemplified. However, the present invention is not limited to this, and arbitrary images such as photos and graphics can be applied.

The latent image generating unit 43 generates or inputs a latent image required to instruct a shape of a discrimination image to be generated by this image generating apparatus. The generated or input latent image is output to the discrimination image data generating unit 44.

In this case, the latent image data is multi-valued image data which can be handled in a pixel unit. This embodiment will explain an example in which three-valued image data is applied as the multi-valued image data since each pixel which forms the latent image data is defined as information used to instruct one of the first, second, and third regions described above. However, the present invention is not limited to this, and arbitrary multi-valued image data of three values or more is applicable.

Figure 12B:

When the latent image data includes a text portion "Original" and line image portions (indicated by hatching in FIG. 12B) which are drawn horizontally above and below the text portion, as shown in FIG. 12B, three-valued image data in which pixels of the text portion are "2", those of the line image portions are "1", and the remaining pixels are "0" is used as the latent image data. Note that the latent image data is three-valued image data, which is applied intact as the latent image data. When image information of four values or more, which draws a pattern or characters, is to be used, three-valued image data may be generated based on that image information, and may be used as the latent image data.

When the latent image generating unit 43 inputs the latent image data, the user selects three-valued image data held in, for example, the HD 36 (FIG. 3) in advance. Alternatively, the user may generate an image by drawing a monochrome multi-valued graphic or character string having the number of tone levels that can be used as a latent image using a normal image edit application and the keyboard 313 (FIG. 3) or mouse 312 (FIG. 3). When the size of the latent image data generated by the latent image generating unit 43 is different from that of image data generated by the image input unit 42, the latent image data may be enlarged (FIG. 6A) or reduced (FIG. 6B) to a predetermined size, and may be rotated through a predetermined angle in some cases. Alternatively, the latent image data may be repetitively laid out on the entire surface or a given portion of image data (FIG. 6C). In this embodiment, the multi-valued image data is applied as latent image region information. However, the present invention is not limited to this, and various kinds of information are applicable as long as they indicate shapes of latent images and lightness levels of them under infrared light. The latent image information generated (or input) by the latent image generating unit 43 is temporarily held in the RAM 35.

The discrimination image data generating unit 44 inputs the image data and latent image data, generates discrimination image data with reference to color information held in the color information holding nit 46 (to be described later), and outputs the generated discrimination image data to the discrimination image output unit 45. Details of the discrimination image data generating processing in this embodiment will be described later.

The color information acquisition unit 47 acquires color information generated by a color information generating apparatus 71 (to be described later), and outputs the acquired color information to the color information holding unit 46. The color information holding unit 46 holds the color information acquired by the color information acquisition unit 47 of the previous stage as a table so as to allow the discrimination image data generating unit 44 to easily refer to the information as needed (it stores the table in a nonvolatile storage unit such as a hard disk). An example of the color information in this embodiment will be described below using a table shown in FIG. 11.

In this case, the color information indicates usage amounts of respective inks in the first, second, and third regions having different infrared absorption characteristics for respective pixel values. In the following description, colors expressed by the ink usage amounts in the first, second, and third regions will be referred to as a first color C1, second color C2, and third color C3, respectively. FIG. 11 shows an example of a color information table in this embodiment. As shown in FIG. 11, each row of the color information corresponds to a predetermined pixel value (for example, Np1). In this case, each pixel value is defined by, for example, R, G, and B color component values. Then, each pixel value holds the ink usage amounts of respective inks used to form the first color C1, those of respective inks used to form the second color C2, and those of respective inks used to form the third color C3. In this case, each numerical value in the table expresses a ratio of ink when a maximum amount of the ink applied per unit area on a printing medium is 100 for each pixel value.

The color information in this embodiment is configured to satisfy at least two following requirements.

The first requirement is to design the first, second, and third colors C1, C2, and C3 to be perceived as the same color or similar colors under ordinary light although the first, second, and third colors C1, C2, and C3 are defined by combinations of different inks for respective pixel values.

The second requirement is to set the ink usage amount of black (K) and/or green (G) contained in the second color C2 to be greater than or equal to that of black (K) and/or green (G) contained in the first color C1. Likewise, the second requirement is to set the amount of black (K) and/or green (G) contained in the third color C3 to be greater than or equal to the ink usage amount of black (K) and/or green (G) contained in the second color C2.

For example, ink usage amounts of green (G) used to define the first, second, and third colors C1, C2, and C3 corresponding to a pixel value Np1 in FIG. 11 are different. That is, the ink usage amounts of green (G) as one of print colors for the pixel value Np1 for the first, second, and third colors C1, C2, and C3 are respectively 0%, 50%, and 60% (applying amounts of black (K) for all of the first, second, and third colors C1, C2, and C3 are 0%). Due to the different ink usage amounts of green (G), the first, second, and third regions are perceived at different lightness levels under infrared light. In pixel values Np5 and Np6, the ink usage amounts of green (G) are controlled according to the same policy.

As shown in a pixel value Np3, the ink usage amounts of black (K) may be controlled in place of green (G). For the pixel value Np3, the ink usage amounts of black (K) for the first, second, and third colors C1, C2, and C3 are respectively 0%, 3%, and 7% (those of green (G) for all of the first, second, and third colors C1, C2, and C3 are 0%).

As shown in a pixel value Np2, the ink usage amounts of green (G) and black (K) may be controlled. For the pixel value Np2, both the ink usage amounts of green (G) and black (K) for the first color C1 are 0%, the ink usage amount of black (K) for the second color C2 is 3%, and the ink usage amount of green (G) for the third color C3 is 50%. Such definitions of the ink usage amounts result from the fact that the infrared absorption characteristics of black (K) are larger than those of green (G), as has been described above using FIG. 2. In particular, in inks applicable to this embodiment, it is known that the infrared absorption characteristic of black (K) is approximately 12 times that of green (G). That is, in order to set different lightness levels under infrared light, the third color C3 can contain green (G) of 36% or more which are 12 times 3% as the infrared absorption characteristic of black (K) contained in the second color C2. In this embodiment, green (G) of 50% is applied to the third color C3 so as to satisfy the aforementioned first requirement at the same time.

As shown in a pixel value Np4, a combined ink usage amount of green (G) and black (K) may be controlled. For the pixel value Np4, the ink usage amounts of both green (G) and black (K) for the first color C1 are 0%. The ink usage amount of black (K) for the second color C2 is 10%, and the ink usage amounts of both green (G) and black (K) for the third color C3 are 5%. The pixel value Np4 adopts definitions of the ink usage amounts since the infrared absorption characteristic of black (K) is larger than that of green (G), as in pixel value Np2. That is, it should be noted that the infrared absorption characteristics of 5% of black (K) and 5% of green (G) contained in the third color C3 are larger than that of 10% of green (G) contained in the second color C2.

The present invention is not limited to the above specific example. For example, the first color C1 may contain several percent of black (K) or green (G) as its ink usage amount. In this case, the second color C2 should contain black (K) or green (G) at percentages (ink usage amount) more than the first color C1, and the third color C3 should contain black (K) or green (G) at percentages (ink usage amount) more than the second ink C2.

Figure 12C:
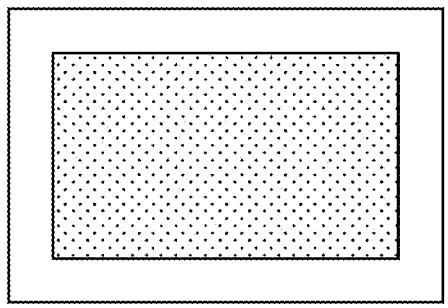
Figure 12D:
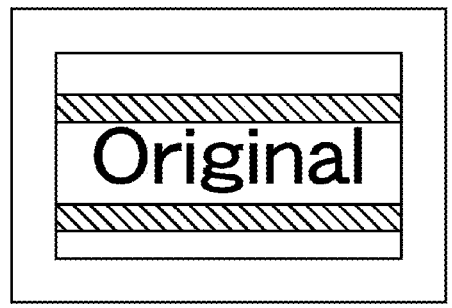
Figure 12E:
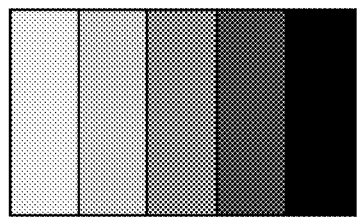

The description will now revert to FIG. 4. When discrimination image data is input from the discrimination image data generating unit 44, the discrimination image output unit 45 executes print processing according to the discrimination image data on a printing medium (printing sheet) using the printer 311 (FIG. 3), thus outputting printed matter on which the discrimination image data is printed. The discrimination image data printed on the printing sheet is observed under ordinary light, as shown in FIG. 12C. However, on an image captured using an infrared camera in an environment in which the printed matter is irradiated with infrared light, latent images (a text region "Original" and line image regions drawn horizontally above and below the text region) can be discriminated as images having different luminance levels, as shown in FIG. 12D.

The arrangement of the image generating apparatus of this embodiment has been described above.

Note that this embodiment has described the arrangement in which the color information generated by the color information generating apparatus 71 (to be described later) is acquired by the color information acquisition unit 47, and is held by the color information holding unit 46. However, the present invention is not limited to such a specific arrangement. For example, the image processing apparatus 41 may include the color information generating apparatus 71 (to be described later), and color information may be generated at the time of the discrimination image generating processing.

Sequence of Image Generating Processing

Figure 5:
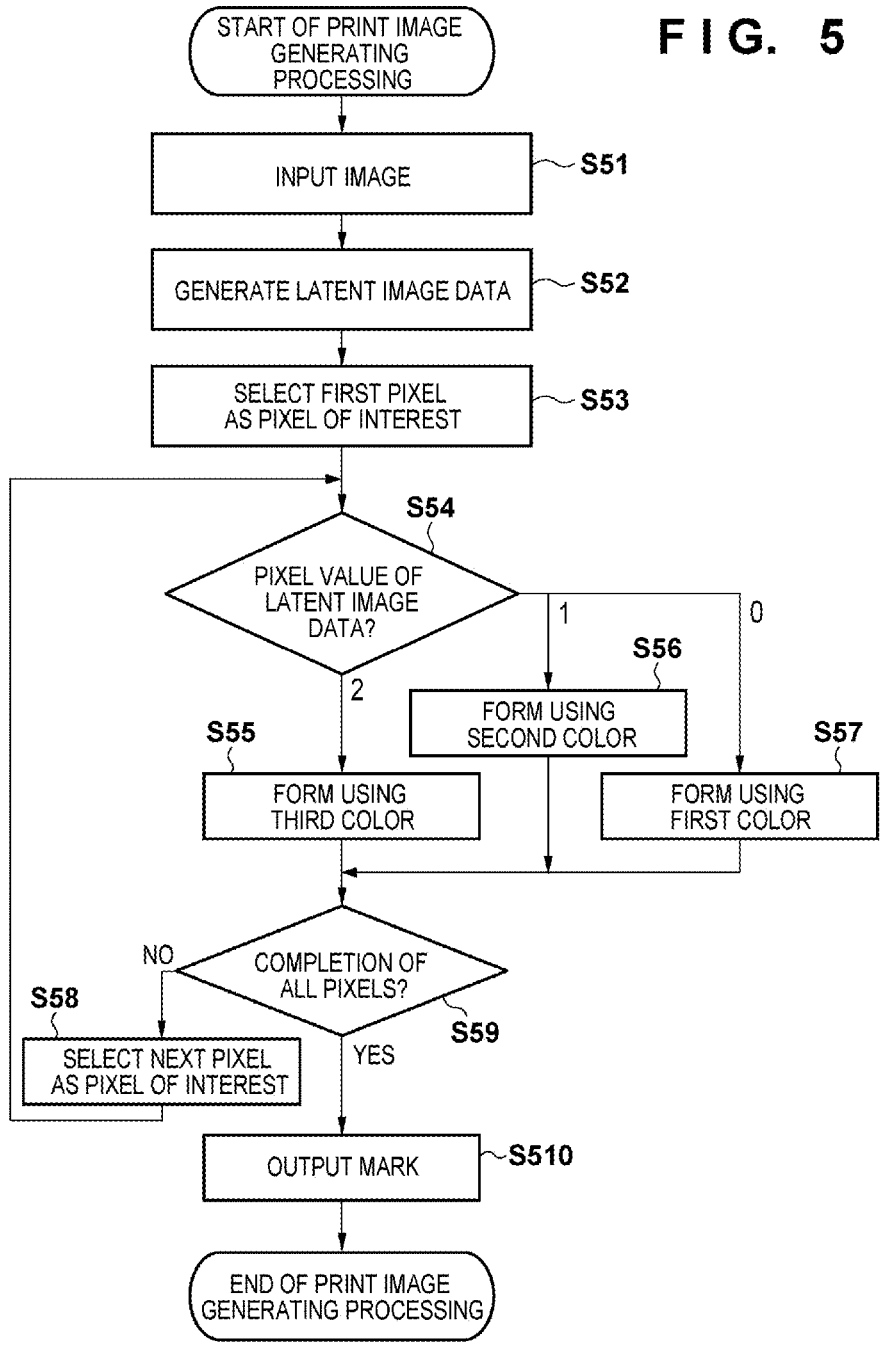
FIG. 5 is a flowchart for explaining the sequence of image generating processing according to an embodiment of the present invention.

The sequence of print image generating processing (calculations of ink usage amounts for respective pixels used in print processing) executed by the image generating apparatus of this embodiment will be described below with reference to FIG. 5. FIG. 5 is a flowchart showing the sequence of the image generating processing applicable to this embodiment.

The image input unit 42 inputs image data (S51), and the latent image generating unit 43 generates latent image data (S52). Then, the discrimination image generating unit 44 selects first pixels of the input image data and latent image data as pixels of interest (S53). After that, the subsequent processes are switched based on a pixel value of the pixel of interest in the latent image data (S54). Note that the latent image data of this embodiment is defined by pixel values of three values, as described above using FIG. 12B. That is, the latent image data is three-valued image data in which the background region is defined by pixels "0", the line image regions are defined by pixels "1", and the text region is defined by pixels "2".

In step S54, a closest color Npi (i is one of 1 to 6 in FIG. 11) is acquired with reference to the color information table (FIG. 11) based on the value of the pixel of interest in the image data input in step S51. In this case, a color having a minimum distance on a color space can be detected as the closest color. The type of the color space is not particularly limited. In this embodiment, since image data defined by RGB values is input, a distance on an RGB color space which does not require any color space conversion can be used. After the color Npi is acquired, when the pixel value of the pixel of interest in the latent image data is "0", "first color C1" of the ink usage amounts corresponding to the pixel value of the pixel of interest of the image data is selected to form discrimination image data with reference to the color information held by the color information holding unit 46 (S57). For example, when a color Np2 is decided, C=24, M=13, Y=09, and K=R=G=B=0 are decided as the first color C1. On the other hand, when the pixel value at the position of the pixel of interest of the latent image data is "1", "second color C2" of the ink usage amounts corresponding to the pixel value of the pixel of interest of the image data is selected to form discrimination image data with reference to the color information held by the color information holding unit 46 (S56). Alternatively, when the pixel value of the latent image data is "2", "third color C3" of the ink usage amounts corresponding to the pixel value of the pixel of interest of the image data is selected to form discrimination image data with reference to the color information held by the color information holding unit 46 (S55). It is then determined whether or not all pixels have been processed (S59). If pixels to be processed still remain, the next pixel is selected in, for example, a raster scan order (S58). On the other hand, if the processing for all the pixels is complete, the discrimination image output unit 45 outputs the finally generated discrimination image data to the printer 311 (S510).

Note that since the latent image (FIG. 12B) is multi-valued image data of three values in this embodiment, the processes are switched according to the three values in step S54. When the latent image is multi-valued image data having tone levels of four values or more, the processes can be switched according to values as many as the number of tone levels. The sequence of the print image generating processing in this embodiment has been described above.

Arrangement of the Color Information Generating Apparatus

The arrangement of the color information generating apparatus 71 applied to this embodiment will be described below with reference to FIG. 7. Note that the following description corresponds to a case in which a power supply of the aforementioned host computer 31 is turned on, and the OS is loaded into the work memory 35. In this case, respective processing units are implemented by corresponding programs and the CPU 33 which executes them or peripheral hardware components in some cases.

Figure 7:
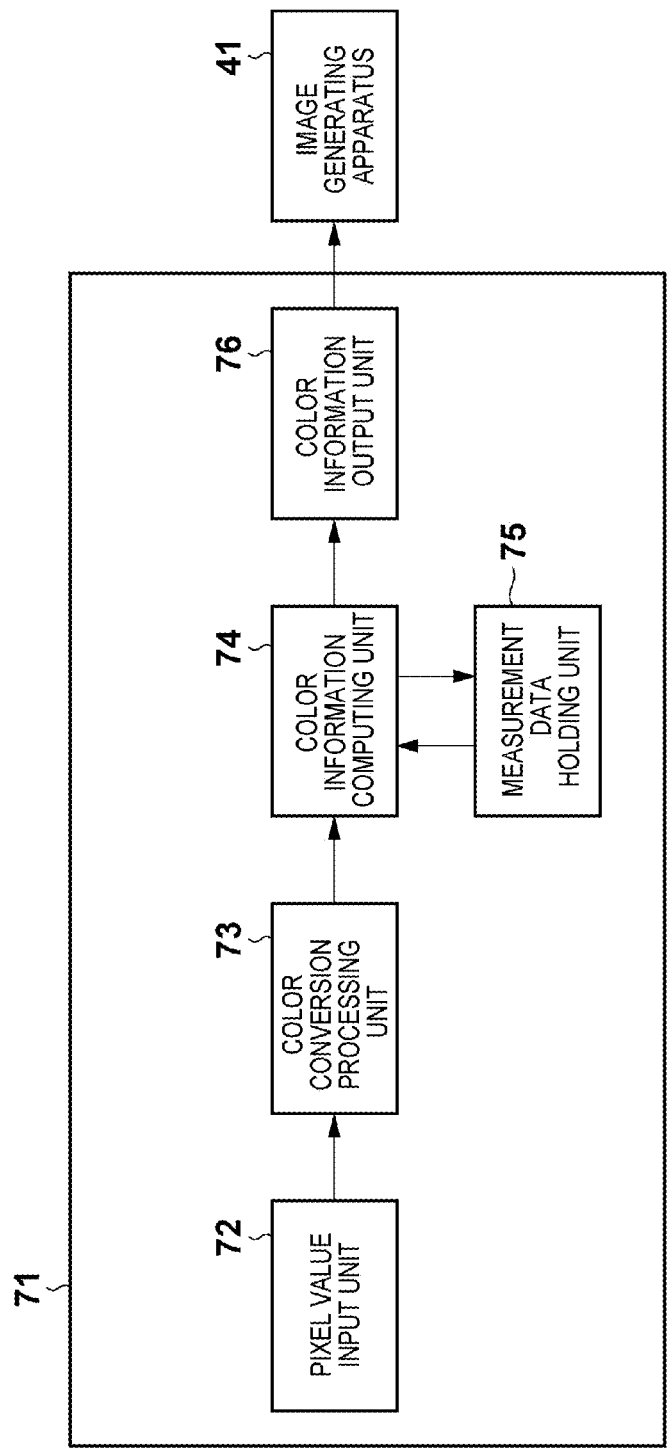
FIG. 7 is a block diagram for explaining the arrangement of a color information generating apparatus according to an embodiment of the present invention.

As shown in FIG. 7, the color information generating apparatus 71 of this embodiment includes a pixel value input unit 72, color conversion processing unit 73, color information computing unit 74, measurement data holding unit 75, and color information output unit 76. Note that color information generating processing to be described below may be implemented by software processing. In this case, the respective units should be considered as conceptual units of functions required for the processing.

The pixel value input unit 72 inputs predetermined pixel values, and outputs the input pixel values to the color conversion processing unit 73. In this embodiment, the pixel values assume values which represent R, G, and B colors by the predetermined number of bits. The pixel value input unit 72 may automatically generate R, G, and B values of the pixel values in turn or at predetermined intervals, and may output the generated pixel values. Alternatively, the pixel value input unit 72 may output values input by the user via the keyboard 312 or those selected via the mouse 313 as the pixel values. Alternatively, the pixel value input unit 72 may input pixel values included in image data input by the image input unit 42 in FIG. 4 in turn.

The color conversion processing unit 73 inputs the pixel values from the pixel value input unit 72, and converts the input pixel values into L*a*b* values in a device-independent color space. The color conversion processing unit 73 further converts the converted L*a*b* values into L'*a'*b'* values in a device-dependent color space, and outputs the converted L'*a'*b'* values to the color information computing unit 74. In this case, "device" is the printer 311 which finally outputs discrimination image data.

With the color conversion processes of the color conversion processing unit 73, the input pixel values can be temporarily converted into common color space data, and the common color space data can be converted into color space data that can be expressed by the device. With these processes, the input pixel values can be converted into a color which can be output by inks used in the printer 311. Note that since the color conversion processes in the color conversion processing unit 73 are state-of-the-art techniques for those who are skilled in the art, a detailed description thereof will not be given.

The color information computing unit 74 calculates ink usage amounts using color measurement data held by the measurement data holding unit 75 based on the L'*a'*b'* values output from the color conversion processing unit 73 of the previous stage, and outputs the calculated ink usage amounts. Details of the color information computing processing in the color information computing unit 74 will be described later.

The measurement data holding unit 75 holds a plurality of L*a*b* values corresponding to ink usage amounts as color measurement data in the form of tables (to be referred to as color measurement tables hereinafter).

Reference numerals 94 and 98 in FIGS. 9A and 9B denote an example of a color measurement table in this embodiment. As shown in FIGS. 9A and 9B, the color measurement table of this embodiment holds respective ink usage amounts corresponding to color measurement data L*a*b* in association with each other. These L*a*b* values are obtained by printing a plurality of measurement patches, ink usage amounts of which are changed sequentially, and measuring in advance the patches in an environment in which they are irradiated with ordinary light.

As shown in FIGS. 9A and 9B, the color measurement table of this embodiment includes a first group 94 shown in FIG. 9A configured by inks including cyan (C), magenta (M), yellow (Y), and black (K), and a second group 98 shown in FIG. 9B configured by inks including cyan (C), magenta (M), yellow (Y), and green (G). The first group 94 holds color measurement tables in which the ink usage amount of black (K) increases stepwise like the color measurement table 91 in which the user amount of black (K) is "0", a color measurement table 92 in which it is "2", a color measurement table 93 in which it is "4", . . . . Likewise, the second group 98 holds color measurement tables in which the ink usage amount of green (G) increases stepwise like the color measurement table 95 in which the user amount of green (G) is "0", the color measurement table 96 in which it is "2", the color measurement table 97 in which it is "4", . . . . That is, it should be noted that according to this embodiment, color measurement tables are grouped according to types of inks having relatively large infrared absorption characteristics, and, within each group, the color measurement tables are stored such that the color usage amount of inks having a relatively large infrared absorption characteristic change stepwise.

Note that this embodiment has exemplified the case in which the ink usage amounts of black (K) and green (G) increase in increments of two steps, as shown in FIGS. 9A and 9B. However, this embodiment is not limited to this, and the tables may be configured to increase or decrease the ink usage amounts in increments or decrements of an arbitrary number of steps. Also, this embodiment has exemplified the case in which black (K) and green (G) are used, as shown in FIGS. 9A and 9B. However, various other inks can be applied as long as they have relatively large infrared absorption characteristics. In this case, the tables can be grouped based on the types of inks having large infrared absorption characteristics.

The color information output unit 76 outputs the ink usage amounts computed by the color information computing unit 74 of the previous stage as color information. The color information output from the color information output unit 76 is held by the color information holding unit 46 in the aforementioned image generating apparatus 41. The arrangement of the color information generating apparatus of this embodiment has been described above.

Sequence of Color Information Generating Processing

Figure 8A:
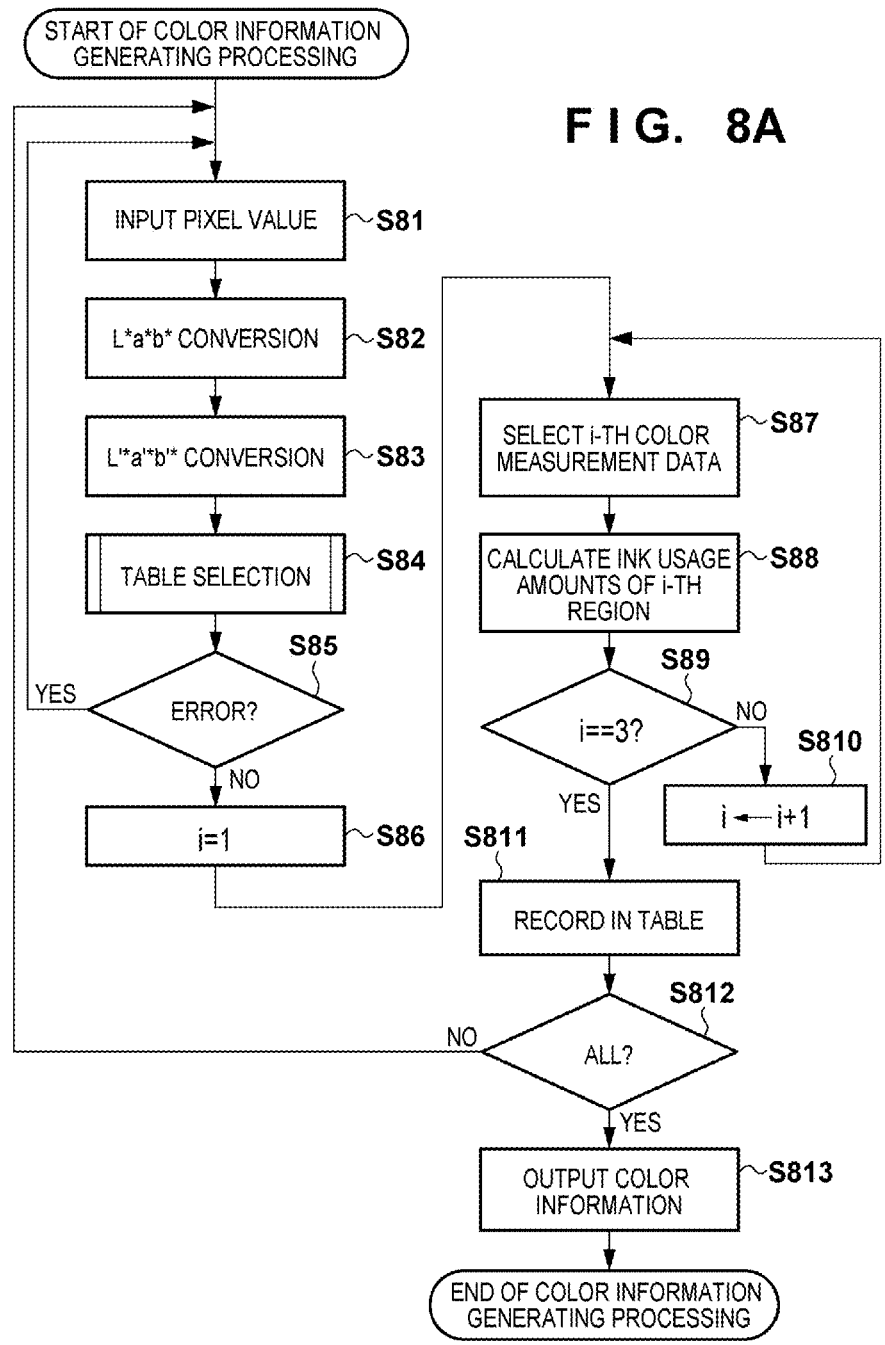
FIGS. 8A and 8B are flowcharts for explaining the sequence of color information generating processing according to an embodiment of the present invention.

The sequence of the color information generating processing executed by the color information generating apparatus 71 of this embodiment will be described below with reference to FIG. 8A. FIG. 8A is a flowchart showing the sequence of the color information generating processing applicable to this embodiment.

The pixel value input unit 72 inputs pixel values (S81), and the color conversion processing unit 73 converts the input pixel values into L*a*b* values (S82) and further converts the converted L*a*b* values into L'*a'*b'* values (S83). After that, the color information computing unit 74 selects color measurement tables to be used from the color measurement tables (S84). Details of the color measurement table selection processing will be described later. Then, it is determined whether or not the color measurement table selection processing has succeeded (S85). If an error has occurred, the process returns to step S81 to input the next pixel values in step S81. If no error occurs, the process advances to step S86. The color information computing unit 74 sets "1" in a variable i (S86), and selects four color measurement data spatially close to the L'*a'*b'* values converted in step S83 from the color measurement tables selected in step S84 (S87). Then, the color information computing unit 74 calculates ink usage amounts to become equal to the L'*a'*b'* values based on the selected measurement data using a tetrahedral-interpolation method (S88).

Figure 10:
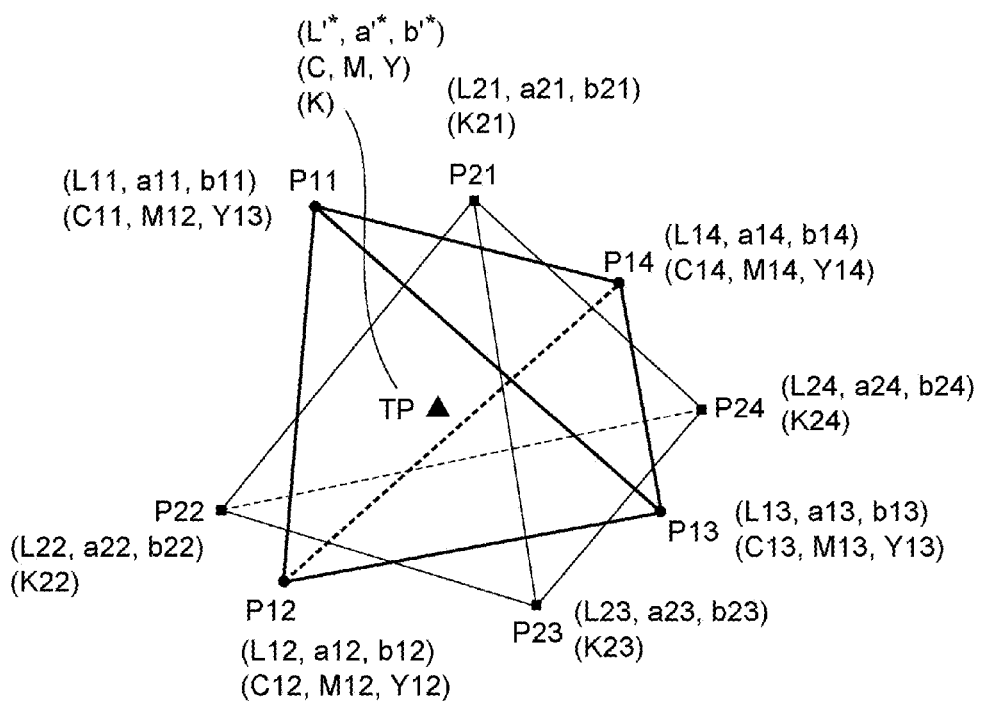
FIG. 10 is a view for explaining a tetrahedral-interpolation method according to an embodiment of the present invention.

The tetrahedral-interpolation method of this embodiment will be described below with reference to FIG. 10. In FIG. 10, four points P11, P12, P13, and P14 are specified by plotting four measurement data points in an Lab space. In particular, these four points represent those included in first color measurement data. For example, the point P11 indicates that measurement data on an L*a*b* space are respectively L11, a11, and b11 when usage amounts of cyan (C), magenta (M), and yellow (Y) are respectively C11, M12, and Y13. Also, at a point Tp, the L*, a*, and b* values are respectively converted into L'*, a'*, and b'* values (i.e., those calculated in step S83). In step S88, ink usage amounts C, M, and Y at the point Tp are calculated from those at the points P11, P12, P13, and P14 by the tetrahedral-interpolation method. Note that details of the tetrahedral-interpolation method are a state-of-the-art technique for those who are skilled in the art, and a detailed description thereof will not be given. Also, this embodiment applies the tetrahedral interpolation using four points so as to calculate the ink usage amounts C, M, and Y at the point Tp. However, the present invention is not limited to this, and interpolation may be made using an arbitrary number of points.

The description will revert to FIG. 8A. The color information computing unit 74 determines whether or not the variable i=3 (S89). If i≠3, the color information computing unit 74 increments the variable i by "1" (S810), and the process returns to step S87. That is, with a loop from step S86 to step S810, combinations of inks which define the first, second, and third regions are calculated. On the other hand, if the variable i=3, the process advances to step S811. Note that in this embodiment, since the latent image (FIG. 12B) is multi-valued image data of three values, it is determined in step S89 whether or not the variable i=3. Alternatively, when the latent image is multi-valued image data of four values or more, it may be determined whether or not the variable i is the same as the number of tone levels of a discrimination image.

The color information computing unit 74 records the ink usage amounts calculated in step S88 as color information (S811). Then, it is determined whether or not processing for all pixel values input by the pixel value input unit 72 is complete (S812). If pixel values to be processed still remain, the next pixel values are input in step S81 to continue the processes. On the other hand, if the processing for all the pixel values is complete, the color information output unit 76 outputs the color information (S813), thus ending the color information generating processing. The sequence of the color information generating processing of this embodiment has been described above.

Color Measurement Table Selection Processing

Details of the color measurement table selection processing in step S84 in FIG. 8A will be described below with reference to FIG. 16A.

The color information computing unit 74 selects an ink type to be used (S161). In particular, in this embodiment, one or both of black (K) and green (G) are selected as inks having a large infrared absorption characteristic. For example, an ink type, which is selected in advance, may be held in the RAM 35, and the held ink type may be acquired in step S161. Alternatively, ink type candidates may be displayed on, for example, the monitor 32, and the user may select a desired ink type using the mouse 312 or keyboard 313.

Next, the color information computing unit 74 selects an ink usage amount range of the ink selected in step S161 (S162). In this embodiment, the ink usage amount ranges for respective ink types are set and held in, for example, the RAM 35, and the ink usage amount range is acquired according to the ink type selected in step S161. For example, the ink usage amount range of black (K) is "5", and that of green (G) is "10". The ink usage amount range selected in step S162 corresponds to a difference between the ink amounts of black (B)/green (G) contained in the first and second regions or in the second and third regions. Since the black (K)/green (G) is an ink having a large infrared absorption characteristic, a lightness difference between the first and second regions and/or that between the second and third regions under infrared light increases with the increase in ink usage amount range selected in step S162. On the other hand, when the ink usage amount range is large, since color differences between the first, second, and third regions become large, it becomes difficult to determine "Y" in step S166 (to be described later). Note that this embodiment will explain a case in which the ink usage amount ranges between the first and second regions and between the second and third regions are set to have the same value. However, different values may be set.

The color information computing unit 74 selects a minimum ink usage amount of the ink selected in step S161 (S163). The minimum ink usage amount selected in step S163 is used as an ink usage amount of black (K) and/or green (G) contained in the first region.

Then, based on the ink type, ink usage amount range, and minimum ink usage amount selected in steps S161, S162, and S163, initial ink usage amounts in the first, second, and third regions are decided (S164). In the following description, initial ink usage amounts of black (K) or green (G) in the first, second, and third regions decided in step S164 will be expressed as initial ink usage amounts or simply as ink usage amounts. For example, assume that black (K) is selected as the ink type in step S161, "5" is selected as the ink usage amount range in step S162, and "0" is selected as the minimum ink usage amount in step S163. In this case, it is decided in step S164 that "0" is used for the first region, "5" is used for the second region, and "10" is used for the third region as the initial ink usage amounts of black (K).

After the initial ink usage amounts are decided in step S164, the color information computing unit 74 acquires color measurement tables based on the decided initial ink usage amounts from those (FIGS. 9A and 9B) held by the measurement data holding unit 75 (S165). In case of the aforementioned example, three color measurement tables including only ink usage amounts "0", "5", and "10" of black (K) are acquired from the first group including black (K) (the group 94 in FIG. 9A).

Next, it is determined whether or not the L'*a'*b'* values converted in step S83 are included in color gamuts which can be expressed by the three color measurement tables acquired in step S165 (S166). Details of this determination method will be described below with reference to FIGS. 14A and 14B.

Figure 14A:
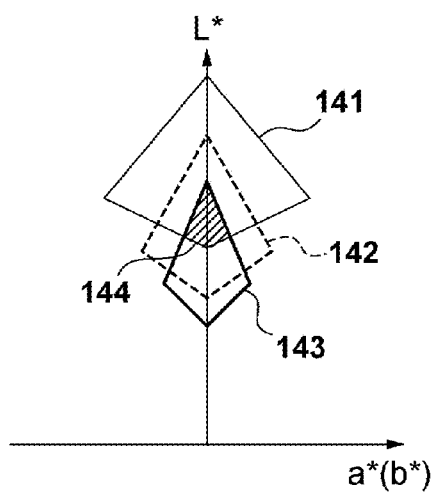
FIGS. 14A and 14B are views for explaining overlaps of color gamuts according to an embodiment of the present invention.
Figure 14B:
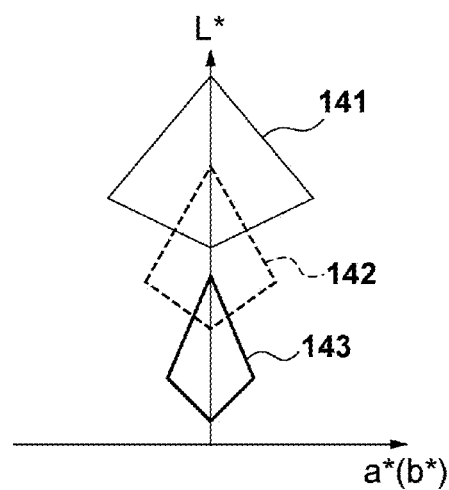

FIGS. 14A and 14B express respective color gamuts expressed by the three color measurement tables acquired in step S165 in the Lab space. For the sake of simplicity, FIGS. 14A and 14B show only a section parallel to an L* axis. In FIG. 14A, reference numeral 141 denotes a color gamut which can be expressed by the color measurement table which includes the ink usage amount "0" of black (K) of those acquired in step S165. Likewise, reference numerals 142 and 143 respectively denote color gamuts which can be expressed by the color measurement tables which include the ink usage amounts "5" and "10" of black (K). In the example shown in FIG. 14A, these three color gamuts include a common region 144 (a hatched region in FIG. 14A). In other words, these three color measurement tables include colors having closer distances on the Lab space (that is, similar colors) although they have different ink usage amounts. When the three color gamuts include the common region, as shown in FIG. 14A, and when the L'*a'*b'* values converted in step S83 are included in this region, "Y" is determined in step S166. On the other hand, although the common region is included, as shown in FIG. 14A, when the L'*a'*b'* values converted in step S83 are not included in this region, "N" is determined in step S166. Alternatively, for example, when the three color measurement tables acquired in step S165 include the ink usage amounts "0", "15", and "30" of black (K), color gamuts 141, 142, and 143 can be expressed by these color measurement tables, as shown in FIG. 14B. When the three color gamuts do not include any common region, as shown in FIG. 14B, "N" is determined in step S166.

Figure 16A:
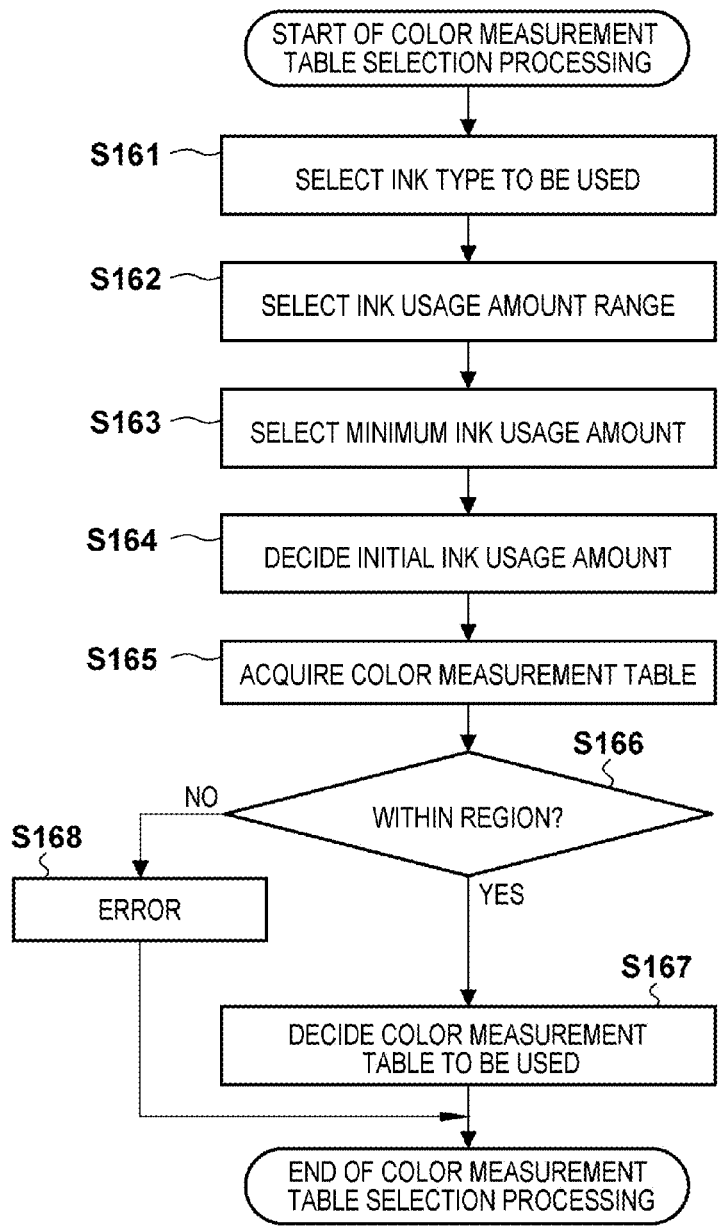
FIGS. 16A and 16B are flowcharts for explaining the sequence of table selection processing according to an embodiment of the present invention.

The description will now revert to FIG. 16A. If "Y" is determined in step S166, the process advances to step S167, and the three color measurement tables acquired in step S165 are decided as finally selected color measurement tables (S167), thus ending the table selection processing. On the other hand, if "N" is determined in step S166, notification is made of the failure of the table selection processing as an "error" (S168), thus ending the processing. Details of the color measurement table selection processing of this embodiment have been described.

As described above, according to the first embodiment, printed matter can be generated, on which image data to be visually recognized under visible light is printed, and which allows visual confirmation of a multi-valued discrimination image of three values or more when it is observed via an image capture device such as an infrared camera under infrared light.

Note that the color information holding unit 46 holds N types of color information C1, C2, . . . , CN having different infrared light ray absorption rates. Then, the latent image generating unit 43 (corresponding to an infrared light ray latent image input unit) inputs multi-valued infrared light ray latent image data of M tones (N≥M≥3). One color information Ci (1≤i≤N) can then be decided according to a value of a pixel of interest of the input infrared light ray latent image data, and the decided color information Ci can be output as pixel values of print image data for the pixel of interest. Hence, the present invention is not limited to the embodiment described above.

Modification 1

In the aforementioned first embodiment, as shown in FIG. 16A, if "N" is determined in step S166, notification is made of an "error" in order to end the color measurement table selection processing. In this case, color information corresponding to the pixel values input in step S81 (FIG. 8A) is not generated. A modification will be described below in which color information can be generated even when "N" is determined in step S166.

Figure 16B:
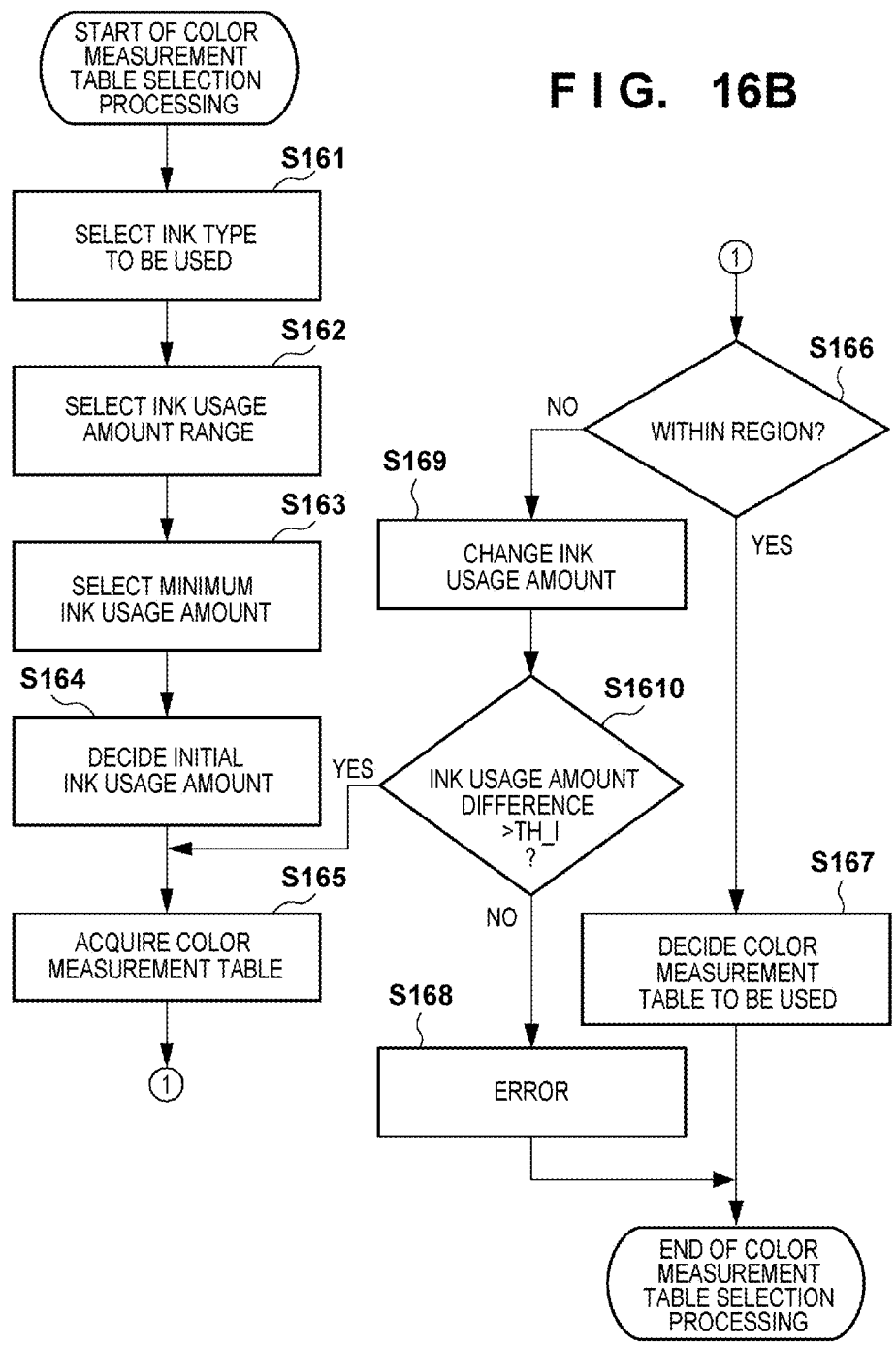

FIG. 16B is a flowchart showing the sequence of the color measurement table selection processing applicable to Modification 1 of this embodiment. In the flowchart of this modification, steps S161 to S168 are the same processes as those shown in FIG. 16A. Hence, only steps S169 and S1610 as different processes in this modification will be described below.

In this modification, if "N" is determined in step S166, the process advances to step S169. In step S169, at least one of the initial ink usage amounts decided in step S164 is changed according to a predetermined rule. As the predetermined rule, a rule for increasing one of the three ink usage amounts by "1" is applicable. In this case, when the ink usage amounts before change of black (K) are respectively "0", "5", and "10", as described above, they can be changed to "1", "5", and "10" (the first ink usage amount of black (K) is increased by "1"). This process will be described below using FIGS. 14A and 14B above. A lightness level is decreased as a result of an increase in ink usage amount of black (K), and the color gamut 141 shifts downward in FIG. 14B. That is, even when the three color gamuts do not include a common region in step S166, changing the ink usage amount in step S169 is more likely to generate a common region in the next determination process in step S166. Of course, two or all of the three ink usage amounts may be changed at the same time. Alternatively, only one ink use value may be increased or decreased by an arbitrary value in place of "1". In any case, at least one ink usage amount is changed before and after step S169.

After the ink usage amount is changed in step S169, it is determined whether or not an ink usage amount difference after change is larger than a threshold TH_I (S1610). In this case, the ink usage amount difference means a difference between the ink usage amount of black (K)/green (G) in the first region and that of black (K)/green (G) in the second region. Likewise, the ink usage amount difference means a difference between the ink usage amount of black (K)/green (G) in the second region and that of black (K)/green (G) in the third region. As the threshold TH_I, a predetermined value can be held in the RAM 35 or HD 36. As described above, since the ink usage amount is changed in step S169, it is more likely to generate a common region in the next determination process in step S166. However, when the ink usage amount is changed too much in step S169, the ink usage amount difference of black (K)/green (G) between the first and second regions or between the second and third regions may become too small. When the ink usage amount difference becomes too small, a lightness difference between the first and second regions or between the second and third regions under infrared light is decreased, and an image consequently becomes harder to be discriminated. In order to prevent this phenomenon, in this modification, the ink usage amount difference after change can be prevented from becoming less than or equal to the predetermined threshold in step S1610.

If it is determined in step S1610 that the ink usage amount difference is larger than threshold TH_I, the process returns to step S165. That is, the color measurement tables are acquired again based on the ink usage amounts after change. Otherwise, notification is made of an "error" in step S168 without deciding any color measurement tables, thus ending the table selection processing. The modification of the color measurement table selection processing of this embodiment has been described above.

Modification 2

In the embodiment described above, when the ink usage amount range is selected in step S162, a value, which is set and held in, for example, the RAM 35 in advance, is selected, as shown in FIG. 16A. However, the present invention is not limited to this. For example, an ink usage amount range may be automatically calculated based on the desired number of tone levels, and maximum and minimum values of ink amounts to be applied, which are input by the user, and the color measurement tables may be selected using the calculated ink usage amount range. A modification in such a case will be described below.

Figure 8B:
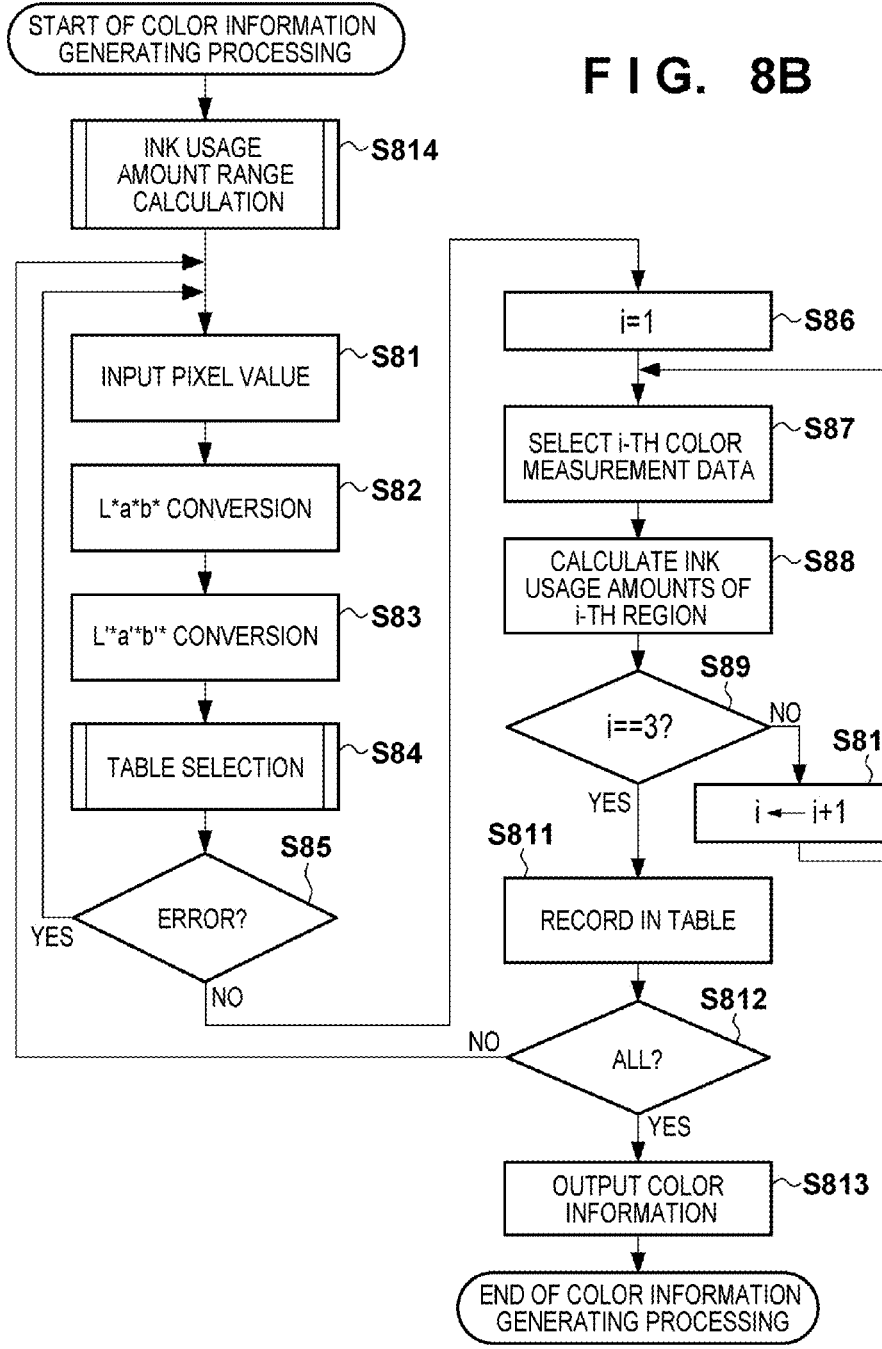

FIG. 8B is a flowchart for explaining the sequence of the color information generating processing applicable to Modification 2 of this embodiment. In the flowchart of this modification, steps S81 to S813 are the same processes as those shown in FIG. 8A. In this modification, prior to the pixel value input process in step S81, an ink usage amount range calculation process (S814) is added unlike in the embodiment described above. Details of the ink usage amount range calculation processing in step S814 will be described below.

Figure 13:
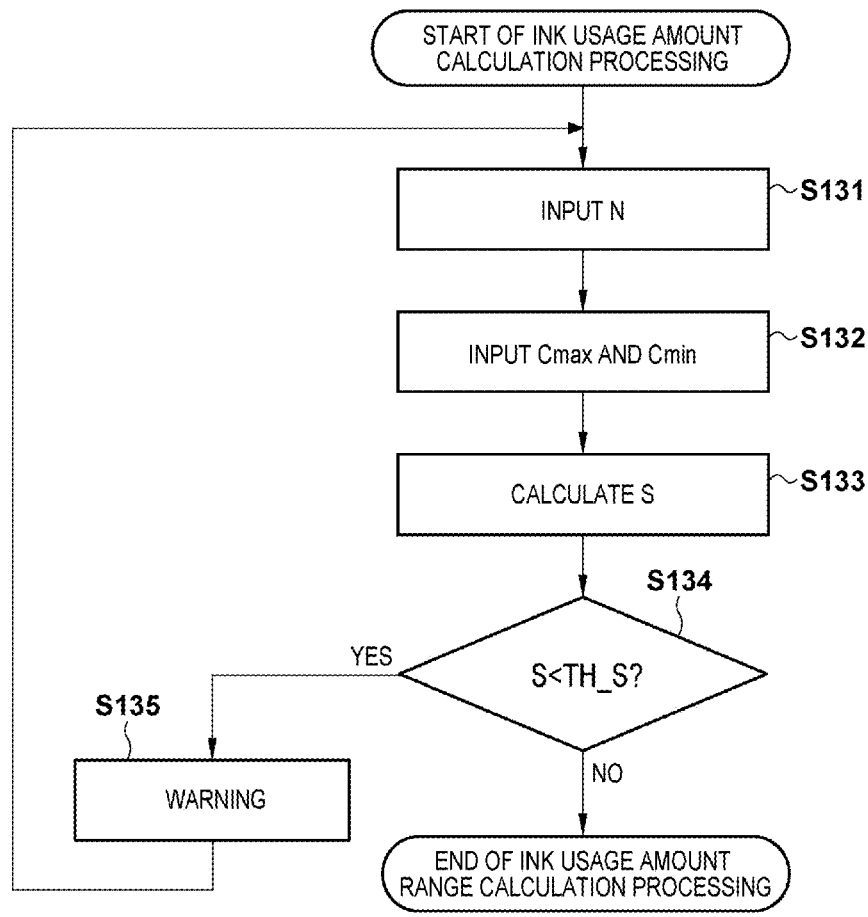
FIG. 13 is a flowchart for explaining the sequence of color information generating processing according to an embodiment of the present invention.

FIG. 13 is a flowchart for explaining the sequence of the ink usage amount range calculation processing applicable to this modification.

The user inputs, using the mouse 312 and keyboard 313, the desired number N of tone levels (S131), and a maximum ink usage amount Cmax and minimum ink usage amount Cmin (S132). Then, an ink usage amount range S is calculated using the input number N of tone levels, maximum ink usage amount Cmax, and minimum ink usage amount Cmin (S133) by:

$$S=(C\max-C\min)/(N-1) \quad (1)$$

Figure 15:
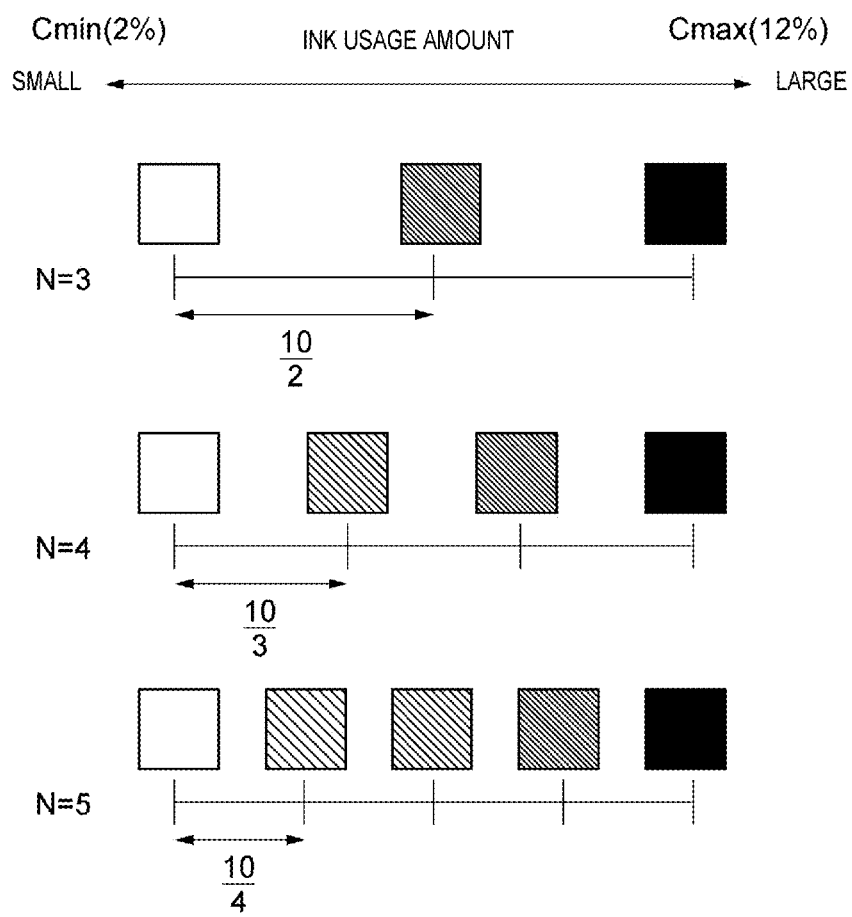
FIG. 15 is a view for explaining a calculation method of an ink usage amount range according to an embodiment of the present invention.

The calculated ink usage amount range S is temporarily held in, for example, the RAM 35. The calculation method of the ink usage amount range S given by equation (1) will be described below with reference to FIG. 15. FIG. 15 explains an example when the number N of tone levels is "3", "4", and "5", and the minimum and maximum ink usage amounts Cmin and Cmax are respectively "2%" and "12%". When these values are substituted in equation (1), the ink usage amount ranges S are respectively calculated as "10/2", "10/3", and "10/4".

Then, it is determined if the ink usage amount range S calculated in step S133 is smaller than a predetermined threshold TH_S (S134). If the ink usage amount range S is smaller than the threshold TH_S, the process advances to step S135; otherwise, the ink usage amount range calculation processing ends. In step S135, a warning message indicating that the ink usage amount range S calculated based on the values input in steps S131 and S132 is too small is displayed on the monitor 32 (FIG. 3), and the process then returns to step S131.

In this modification, the user can input an arbitrary number N of tone levels, maximum ink usage amount Cmax, and minimum ink usage amount Cmin. For this reason, when the ink usage amount range S calculated based on these input values is too small, a desired lightness difference is unlikely to be generated under infrared light. Hence, in this modification, if the ink usage amount range S calculated in step S134 is smaller than the threshold TH_S, a warning is generated in step S135, and the process returns to step S131 to prompt the user to input another number N of tone levels, maximum ink usage amount Cmax, and minimum ink usage amount Cmin again.

Note that when individual ink usage amount ranges are set for a plurality of ink types (for example, black (K) and green (G)), the aforementioned ink usage amount range calculation processing may be applied to each ink type.

In this modification, in step S162 in the subsequent table selection processing (FIG. 16A or 16B), the ink usage amount range S calculated using equation (1) can be acquired from, for example, the RAM 35 when it is applied. Also, the minimum ink usage amount selection processing in step S163 can be skipped.

In the above description, when the desired number of tone levels cannot be satisfied, the user inputs the number of tone levels again after a warning. However, the present invention is not limited to this. For example, the maximum number of tone levels that can be realized may be re-calculated from the input image without prompting the user to re-input the number of tone levels again, and the processes may progress based on that number of tone levels. Alternatively, in another method, the need to prompt the user to input the desired number N of tone levels in step S131 may be obviated, and the number of tone levels may be automatically calculated from the input image. In this case, the maximum number of tone levels that can be realized can be calculated based on default values of the maximum ink usage amount Cmax, minimum ink usage amount Cmin, and threshold TH_S, which are saved in advance. The modification of the color information generating processing of this embodiment has been described above. Note that in the above description, inks are used as color materials. Alternatively, toners may be used as color materials.

<Second Embodiment>

The first embodiment and its modifications have exemplified the case in which the image generating apparatus 41 and color information generating apparatus 71 are implemented using a host computer such as a personal computer. The second embodiment will exemplify a case in which some functions of the image generating apparatus 41 are built into a printing apparatus. Furthermore, in the first embodiment, the image input unit 42 inputs or generates an image which can be visually confirmed under ordinary light, and the latent image generating unit 43 inputs or generates an image which can be recognized via an infrared image capture device under infrared light rays. For this purpose, the first embodiment requires two images. However, if a meaningful image need only be observed via an infrared image capture device under infrared light rays, in other words, if it is acceptable to form an image which, at a glance, has no meaning under ordinary light, only a latent image may be input. The second embodiment will explain such an example.

Figure 17:
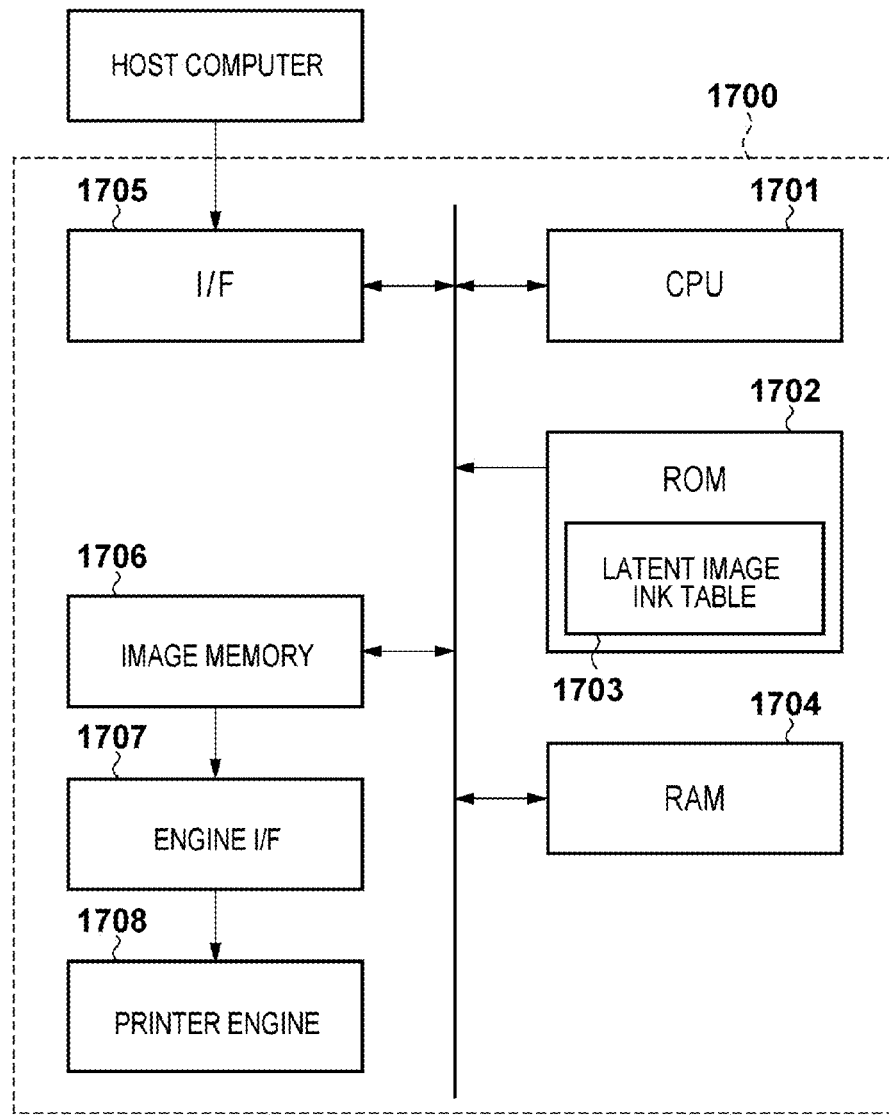
FIG. 17 is a block diagram of a printing apparatus according to the second embodiment.

FIG. 17 is a block diagram showing the arrangement of a printing apparatus 1700 according to the second embodiment. This printing apparatus 1700 has a CPU 1701 which controls the overall apparatus, a ROM 1702 which stores programs, font data, a latent image ink table 1703 (to be described in detail later), and a RAM 1704 used as a work area of the CPU 1702. Also, the printing apparatus 1700 has an interface 1705 which receives print data from a host computer, an image memory 1706 onto which print image data is developed based on the received print data, a printer engine 1708 which prints an image on a printing sheet using inks, and an engine interface 1707 which outputs ink values for respective pixels developed onto the image memory 1706 to the printer engine 1708.

For the sake of simplicity, assume that there are four ink types used by the printing apparatus according to the second embodiment are, that is, C, M, Y, and K, their infrared light ray absorption rates are the same as in FIG. 2, the infrared light ray absorption rate of only the K ink increases according to its usage amount, and the remaining C, M, and Y inks do not absorb any infrared light rays (their absorption rates are negligible if they absorb infrared light rays).

Figures 18, 19:
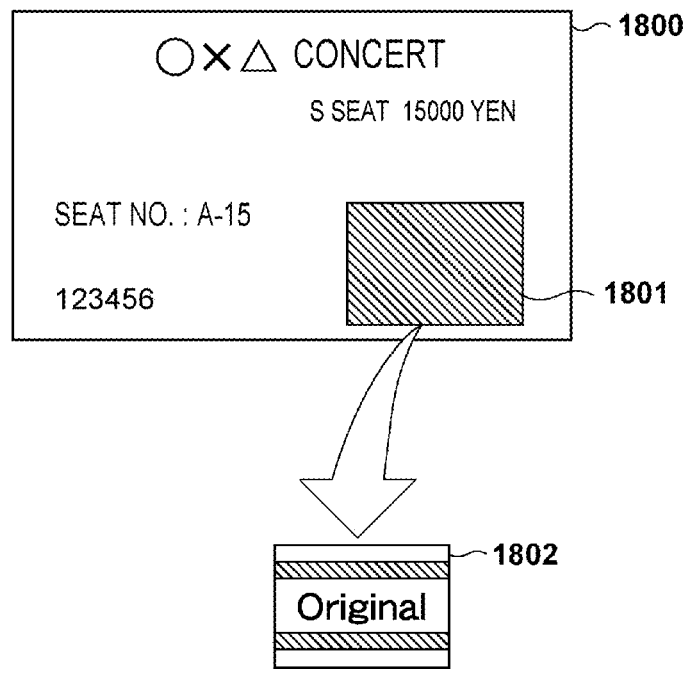
FIG. 18 is a view showing a ticket printed according to the second embodiment of the present invention.
FIG. 19 shows a latent image ink table according to the second embodiment of the present invention.

The latent image ink table 1703 of the second embodiment has the configuration shown in FIG. 19. In FIG. 19, to left end fields, pixel values for an infrared light ray latent image are assigned. Since this embodiment shows an example of three values, values "0", "1", and "2" are assigned. However, i of "$C_{i,j}$" other than the left end fields indicates a pixel value of the latent image, and assumes one of "0" to "2". Also, j is a value required to specify a color, and assumes a value ranging from 0 to n. Assume that the latent image ink table 1703 satisfies the following three conditions.

Condition 1: $C_{i,0}$ to $C_{i,n}$ (i is fixed) are combinations of color inks which can yield identical infrared light ray absorption rates. For example, the Y, M, and C inks of $C_{0,0}$, $C_{0,1}$, ..., $C_{0,n}$ may assume different values, but the K ink always assumes the same value.

Condition 2: Infrared light ray absorption rates of $C_{0,x}$, $C_{1,x}$, and $C_{2,x}$ (x is an arbitrary value ranging from 0 to n) are different from each other.

Condition 3: $C_{0,j}$ to $C_{2,j}$ (j is fixed) define the same color or approximate colors which cannot be perceived by human vision under ordinary light (a color difference can be less than or equal to a set threshold). For example, $\{C_{0,1}, C_{1,1}, C_{2,1}\}$ which neighbor vertically in FIG. 19 mean the same color or approximate colors under ordinary light.

Under the above assumptions, an operator executes an appropriate application program on the host computer, and edits and creates a design of a concert ticket as shown in, for example, FIG. 18. In this case, assume that the application draws and edits an image whose pixel values correspond to three tones in a region 1801 shown in FIG. 18, and the operator can set the interior of the region 1801 as an infrared light ray latent image region. Then, assume that the operator issues a print instruction on the application. As a result, assume that a printer driver on the host computer generates PDL data by executing the same processes as normal processes except for the region 1801, generates commands indicating that the region 1801 (e.g., an upper left corner position of a rectangular region, and horizontal and vertical sizes) is an infrared light ray latent image region, generates three-valued image data in that region as PDL data for the interior of the region 1801, and outputs these PDL data and commands to the printing apparatus 1700.

Upon reception of print data from the host computer, the CPU 1701 of the printing apparatus 1700 executes processing for storing the print data in a reception buffer allocated in the RAM 1704, processing for developing a print image for one page based on the stored print data onto the image memory 1706 (rendering processing), and processing for outputting the print image to the printer engine 1708 via the engine I/F 1707. Since the processing for receiving the print data and the storage processing of that data in the reception buffer are the same as those in a normal printer, only the rendering processing and output processing to the printer engine by the CPU 1701 will be described below with reference to the flowchart shown in FIG. 20.

The CPU 1701 reads data from the reception buffer (S201). The CPU 1701 determines whether the read data is an infrared light ray latent image command (S202) or a page end command (S203). If the read data is neither an infrared light ray latent image command nor a page end command, since the read data can be determined as a normal PDL command, the CPU 1701 executes rendering processing according to that command (S205). On the other hand, if it is determined that the read data is the infrared light ray latent image command, the CPU 1701 executes rendering processing for an infrared light ray latent image (S204). If it is determined that the read data is the page end command, the process advances to step S206, and the CPU 1701 outputs the rendering result developed onto the image memory 1706 so far to the printer engine 1708 via the engine I/F 1707, thus forming an image on a printing medium such as a printing sheet.

The normal rendering processing in step S205 is not the gist of the present invention, and can use a known rendering process. Hence, the rendering processing for an infrared light ray latent image in step S204 will be described below with reference to the flowchart shown in FIG. 21.

In step S251, the CPU 1701 reads a pixel value p of an infrared light ray latent image from the reception buffer. As described above, the value p assumes one of "0", "1", and "2". The CPU 1701 generates a random number r (S252). A generation algorithm of the random number is not particularly limited, and the random number may be generated by either software or hardware. However, as can be seen from FIG. 19, the random number r to be generated is an integer within a range from 0 to n. After that, the CPU 1701 reads out ink amounts {Y, M, C, K} specified by $C_{p,r}$ in the latent image ink table 1703, and writes the readout ink amounts at a corresponding position of the image memory 1706 as print pixel values of a pixel of interest (S253). Then, the process advances to step S254, and the CPU 1701 determines whether or not the processing is complete for all pixels of the infrared light ray latent image region. If NO in step S254, the process returns to step S251 to render the next pixel. If it is determined in step S254 that the rendering processing for all pixels in the infrared light ray latent image region is complete, this processing ends.

As a result of the above processing, the ticket shown in FIG. 18 is printed. Also, the region 1801 can be seen as an image in which colors of n types are randomly laid out (a scrambled image) under ordinary light, and an image of two or more tones (three tones in this embodiment), as denoted by reference numeral 1802 in FIG. 18, can be seen when it is observed via an infrared camera under infrared light rays.

Note that in the description of the second embodiment, the printing apparatus holds the infrared light ray latent image ink table. For example, the host computer may hold the infrared light ray latent image ink table. In this case, the printer driver which runs on the host computer executes processing corresponding to FIG. 21.

Note that the description of the second embodiment has been given under the assumptions that there are four types of printing materials, that is, C, M, Y, and K, and that the infrared light ray latent image is a three-valued image. However, these assumptions do not limit the present invention. That is, let $\{C_{p,1}, C_{p,2}, \ldots, C_{p,q}\}$ (q is an integer greater than or equal to 2) be color information when a color difference under visible light is less than or equal to a set threshold, and let p be a value required to specify an infrared light ray absorption rate, the latent image ink table 1703 need only hold items of color information $\{C_{p1,1}, C_{p1,2}, \ldots, C_{p1,q}\}$, $\{C_{p2,1}, C_{p2,2}, \ldots, C_{p2,q}\}, \ldots, \{C_{pN,1}, C_{pN,2}, \ldots, C_{pN,q}\}$ having different infrared light ray absorption rates p1 to pN. Then, a value L required to specify an infrared light ray absorption rate may be decided according to a value of a pixel of interest of input infrared light ray latent image data, a random number value r falling within a range from 1 to q may be generated using a predetermined random number generating unit, and color information $C_{L,r}$ specified by the decided values L and r may be output as pixel values of print image data for the pixel of interest.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-259522, filed Nov. 19, 2010, which is hereby incorporated by reference herein in its entirety.

What is claimed is:

1. An image processing apparatus for outputting print image data to a printing unit which prints an image by applying a printing material to a printing medium, comprising:

a color information holding unit which holds items of color information C1, C2, ..., CN each indicating usage amounts of printing materials, used by the printing unit, of N types (N≥3), a color difference under visible light of which is not more than a pre-set threshold, and which have different infrared light ray absorption rates;

a latent image input unit which inputs infrared light ray latent image data of M tones under infrared light (N≥M≥3); and an output unit which decides one color information item Ci (1≤i≤N) held by said color information holding unit according to a value of a pixel of interest of the input infrared light ray latent image data, and outputs, to the printing unit, the decided color information item Ci as pixel values of print image data corresponding to the pixel of interest, wherein, assuming that $\{C_{p,1}, C_{p,2}, \ldots, C_{p,q}\}$ (q is an integer not less than 2) is color information when a color difference under the visible light is not more than a pre-set threshold, and that p is a value required to specify an infrared light ray absorption rate, said color information holding unit holds items of color information $\{C_{p1,1}, C_{p1,2}, \ldots, C_{p1,q}\}$, $\{C_{p2,1}, C_{p2,2}, \ldots, C_{p2,q}\}, \ldots, \{C_{pN,1}, C_{pN,2}, \ldots, C_{pN,q}\}$ having different infrared light ray absorption rates p1 to pN, and said output unit decides a value L required to specify an infrared light ray absorption rate according to a value of the pixel of interest of the input infrared light ray latent image data, generates a random number value r falling within a range from 1 to q using a predetermined random number generating unit, and outputs color information $C_{L,r}$ specified by the decided values L and r to the printing unit as pixel values of print image data corresponding to the pixel of interest.

2. The apparatus according to claim 1, wherein, in response to infrared light ray absorption amounts of printing material being higher than a pre-set threshold value, amounts of printing material are fixed lower than said pre-set threshold value for infrared light ray absorption.

3. The apparatus according to claim 1, wherein a usage amount difference between printing materials in the color information is decided using minimum and maximum usage amounts of a printing material included in the color information, and the number N of tone levels of the infrared light ray latent image data.

4. The apparatus according to claim 1, further comprising an image input unit which inputs image data to be visually confirmed under visible light, wherein said output unit, using pixel values corresponding to the positions of said pixels of interest, both within the image data input by said image input unit as well as within the infrared light ray latent image data input by said latent image input unit, sets one item of color information, held by said color information holding unit, and outputs said color information, as pixel values of said print image data, corresponding to said pixels of interest.

5. A control method of an image processing apparatus for outputting print image data to a printing unit which prints an image by applying a printing material to a printing medium, the method comprising:

a color information holding step of controlling a color information holding unit to hold items of color information C1, C2, ..., CN each indicating usage amounts of printing materials, used by the printing unit, of N types (N≥3), a color difference under visible light of which is not more than a pre-set threshold, and which have different infrared light ray absorption rates;

a latent image input step of controlling a latent image input unit to input infrared light ray latent image data of M tones under infrared light (N≥M≥3); and an output step of controlling an output unit to decide one color information item Ci ($1 \leq i \leq N$) held in the color information holding step according to a value of a pixel of interest of the input infrared light ray latent image data, and to output the decided color information item Ci as pixel values of print image data corresponding to the pixel of interest to the printing unit, wherein, assuming that $\{C_{p,1}, C_{p,2}, \ldots, C_{p,q}\}$ (q is an integer not less than 2) is color information when a color difference under the visible light is not more than a pre-set threshold, and that p is a value required to specify an infrared light ray absorption rate, said color information holding unit holds items of color information $\{C_{p1,1}, C_{p1,2}, \ldots, C_{p1,q}\}, \{C_{p2,1}, C_{p2,2}, \ldots, C_{p2,q}\}, \ldots, \{C_{pN,1}, C_{pN,2}, \ldots, C_{pN,q}\}$ having different infrared light ray absorption rates p1 to pN, and said output unit decides a value L required to specify an infrared light ray absorption rate according to a value of the pixel of interest of the input infrared light ray latent image data, generates a random number value r falling within a range from 1 to q using a predetermined random number generating unit, and outputs color information $C_{L,r}$ specified by the decided values L and r to the printing unit as pixel values of print image data corresponding to the pixel of interest.

6. A non-transitory computer-readable storage medium storing a program for controlling a computer to execute respective steps included in a control method of an image processing apparatus of claim 5.

* * * * *